(12) United States Patent
Lowenthal et al.

(10) Patent No.: US 11,183,001 B2
(45) Date of Patent: Nov. 23, 2021

(54) ELECTRIC VEHICLE CHARGING STATION HOST DEFINABLE PRICING

(75) Inventors: Richard Lowenthal, Cupertino, CA (US); Praveen Mandal, Los Altos Hills, CA (US); Milton Tormey, Los Altos, CA (US); Srinivas Rao Swarnapuri, San Jose, CA (US); James Solomon, Saratoga, CA (US)

(73) Assignee: CHARGEPOINT, INC., Campbell, CA (US)

( * ) Notice: Subject to any disclaimer, the term of this patent is extended or adjusted under 35 U.S.C. 154(b) by 347 days.

(21) Appl. No.: 12/697,188

(22) Filed: Jan. 29, 2010

(65) Prior Publication Data
US 2011/0191265 A1 Aug. 4, 2011

(51) Int. Cl.
*G06Q 30/06* (2012.01)
*G07F 15/00* (2006.01)
(Continued)

(52) U.S. Cl.
CPC .............. *G07F 15/005* (2013.01); *B60L 3/12* (2013.01); *B60L 53/305* (2019.02); *B60L 53/64* (2019.02);
(Continued)

(58) Field of Classification Search
CPC ...... G06Q 50/06; G06Q 30/0206; G06F 1/26; B60L 11/184; B60L 11/185;
(Continued)

(56) References Cited

U.S. PATENT DOCUMENTS 5,327,066 A 7/1994 Smith
5,548,200 A * 8/1996 Nor et al. .................. 320/109
(Continued)

FOREIGN PATENT DOCUMENTS

JP 07078290 A 3/1995
JP 2001344662 A 12/2001
(Continued)

OTHER PUBLICATIONS

Davis, B. M. (2010). Understanding the effects and infrastrcuture needs of plug-in electric vehicle (PEV) charging (1483914). Available from ProQuest Dissertations and Theses Professional. (856133438). Retrieved from https://dialog.proquest.com/professional/docview/856133438?accountid=131444 (Year: 2010).*
(Continued)

*Primary Examiner* — Michael P Harrington
(74) *Attorney, Agent, or Firm* — Nicholson De Vos Webster & Elliott LLP

(57) ABSTRACT

An electric vehicle charging station network includes multiple electric vehicle charging stations belonging to multiple charging station hosts. Each host controls one or more charging stations. A charging station network server provides an interface that allows each of the hosts to define one or more pricing specifications for charging electric vehicles on one or more of their electric vehicle charging stations belonging to that host. The pricing specifications are applied to the charging stations such that a cost of charging electric vehicles using those charging stations is calculated according to the pricing specifications.

6 Claims, 19 Drawing Sheets

(51) Int. Cl.

| | |
|---|---|
| *B60L 3/12* | (2006.01) |
| *G06Q 50/06* | (2012.01) |
| *B60L 53/65* | (2019.01) |
| *B60L 55/00* | (2019.01) |
| *B60L 53/30* | (2019.01) |
| *B60L 53/64* | (2019.01) |
| *B60L 53/66* | (2019.01) |
| *H02J 7/00* | (2006.01) |

(52) U.S. Cl.
CPC ............ *B60L 53/65* (2019.02); *B60L 53/665* (2019.02); *B60L 55/00* (2019.02); *G06Q 30/06* (2013.01); *G06Q 50/06* (2013.01); *B60L 2240/72* (2013.01); *B60L 2240/80* (2013.01); *B60L 2250/10* (2013.01); *B60L 2250/16* (2013.01); *B60L 2260/52* (2013.01); *B60L 2260/54* (2013.01); *B60L 2260/58* (2013.01); *H02J 7/0027* (2013.01); *Y02E 60/00* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01); *Y04S 50/10* (2013.01)

(58) Field of Classification Search
CPC ............ B60L 11/1838; B60L 11/1844; B60L 11/1842; B06L 11/1842
USPC ........................................................ 705/412
See application file for complete search history.

(56) References Cited

U.S. PATENT DOCUMENTS

| | | | |
|---|---|---|---|
| 5,563,491 A | 10/1996 | Tseng | |
| 6,081,205 A * | 6/2000 | Williams | 340/932.2 |
| 8,249,933 B2 | 8/2012 | Sakaibara et al. | |
| 2003/0018589 A1* | 1/2003 | Jones | 705/413 |
| 2004/0059693 A1* | 3/2004 | Hausen et al. | 705/418 |
| 2008/0040263 A1 | 2/2008 | Pollack et al. | |
| 2008/0228613 A1* | 9/2008 | Alexander | G06Q 20/102 705/35 |
| 2009/0043520 A1* | 2/2009 | Pollack et al. | 702/62 |
| 2009/0062967 A1 | 3/2009 | Kressner | |
| 2009/0144150 A1 | 6/2009 | Sakakibara et al. | |
| 2009/0210357 A1* | 8/2009 | Pudar et al. | 705/412 |
| 2009/0313098 A1 | 12/2009 | Hafner et al. | |
| 2009/0313103 A1* | 12/2009 | Ambrosio et al. | 705/14.25 |
| 2009/0313174 A1 | 12/2009 | Hafner et al. | |
| 2010/0145885 A1* | 6/2010 | Graziano | B60L 11/1816 705/412 |
| 2010/0161480 A1* | 6/2010 | Littrell | 705/40 |
| 2010/0161482 A1* | 6/2010 | Littrell | 705/40 |
| 2010/0211643 A1* | 8/2010 | Lowenthal et al. | 709/206 |
| 2010/0237985 A1* | 9/2010 | Landau-Holdsworth et al. | 340/5.8 |
| 2010/0241542 A1* | 9/2010 | Pinkusevich et al. | 705/34 |
| 2010/0241560 A1* | 9/2010 | Landau-Holdsworth et al. | 705/39 |
| 2010/0274570 A1* | 10/2010 | Proefke | B60L 53/30 705/1.1 |
| 2010/0306033 A1* | 12/2010 | Oved et al. | 705/10 |
| 2010/0315197 A1* | 12/2010 | Solomon | G06F 21/31 340/5.2 |
| 2011/0015821 A1* | 1/2011 | Tran | 701/33 |
| 2011/0071932 A1* | 3/2011 | Agassi et al. | 705/34 |
| 2011/0074350 A1* | 3/2011 | Kocher | 320/109 |
| 2011/0161143 A1* | 6/2011 | Tajima | 705/14.1 |
| 2011/0175569 A1* | 7/2011 | Austin | 320/109 |

FOREIGN PATENT DOCUMENTS

| | | |
|---|---|---|
| JP | 2003007348 A | 1/2003 |
| JP | 2008118285 A | 5/2008 |
| JP | 2009008609 | 1/2009 |
| JP | 2009141991 | 6/2009 |
| WO | 2010074856 A1 | 7/2010 |

OTHER PUBLICATIONS

Kim, J. (2010). Location of refueling stations for alternative fuel vehicles considering driver deviation behavior and uneven consumer demand: Model, heuristics, and GIS (3432463). Available from ProQuest Dissertations and Theses Professional. (821819841). (Year: 2010).*
(Item V continued) Retrieved from https://dialog.proquest.com/professional/docview/821819841?accountid=131444 (Year: 2010).*
PCT International Search Report and Written Opinion of the International Searching Authority for PCT/US2011/023046, dated Apr. 7, 2011, 8 pages.
First Office Action for Japanese Patent Application JP 2012-551350, dated Sep. 17, 2013, 2 pages.
First Korean Office Action for 10-2012-7018151, dated May 27, 2014, 5 pages.
First Chinese Office Action for 201180007583.5, dated Jun. 3, 2014, 11 pages.
Final Rejection for JP Patent Application 2012-551350, dated Jul. 7, 2014, 3 pages.
First Canadian Office Action, Application No. 2,785,705, dated Dec. 15, 2015, 6 pages.
Second Office Action for Chinese application No. 201180007583.5, dated Mar. 9, 2015, 7 pages.
Second Office Action for Korean application No. 10-2012-7018151, dated Mar. 31, 2015, 7 pages.
First Examination Report for Australian application No. 2011210669, dated Oct. 7, 2015, 3 pages.
Final Rejection for Korean application No. 10-2012-7018151, dated Jan. 29, 2016, 7 pages.
Fourth Office Action for Korean application No. 10-2012-7018151, dated Jun. 16, 2016, 8 pages.
Communication pursuant to Rules 70(2) and 70a(2) EPC for Application No. 11737782.0, dated Dec. 20, 2017, 1 page.
Extended European Search Report for Application No. 11737782.0, dated Dec. 1, 2017, 8 pages.
First Office Action for Japanese application No. 2014-227381, dated Dec. 2, 2015, 4 pages.
Notification of Reasons for Refusal from foreign counterpart Japanese Patent Application No. 2014227381 dated Nov. 14, 2016, 9 pages.
Second Office Action from foreign counterpart Canadian Patent Application No. 2785705, dated Jan. 10, 2017, 4 pages.
Third Office Action from foreign counterpart Canadian Patent Application No. 2785705, dated Dec. 13, 2017, 4 pages.

* cited by examiner

| Home | Reports ▶ | Stations ▶ | Configure ▶ | My Account ▶ | Changing Stations ▶ | Help ▶ |

1005

| Time-Based Pricing Profile | Access List | Pricing Specification | Apply Pricing Specification |

Name: 1010 — Public
Access Type: 1015 — Allow
Smart Card Serial Number: * — 1020

Submit — 1025

| Access Name | Type | Serial Number |
|---|---|---|
| Fleet Users | Allow | 1111, 2222, 3333, 4444, 5555, 6666, 7777, 8888 |
| Public Users | Allow | * |

ELECTRIC VEHICLE CHARGING STATION HOST DEFINABLE PRICING

BACKGROUND

Field

Embodiments of the invention relate to the field of charging electric vehicles; and more specifically to electric vehicle charging station host definable pricing.

Background

Electric vehicle charging stations (hereinafter "charging stations") provide charging points for electric vehicles (e.g., electric battery powered vehicles, gasoline/electric battery powered vehicle hybrids, etc.). Charging stations may be located in designated charging locations (e.g., similar to a gas station), parking spaces (e.g., public parking spaces and/or private parking space), etc.

Some electric vehicle charging services sell subscriptions and/or establish a price to use a charging station per charging session, which is a period of time (typically limited to twenty four hours) during which energy may be transferred between an electric vehicle and a charging station. However, these prices are typically not market driven and are inflexible. For example, regardless of the amount of energy being transferred or the duration of the charging session, the cost will be the same if the price is based on a per charging session basis. This may prevent turnover rising to inefficient usage of charging stations.

Some electric vehicle charging services may also sell or provide functionality over a network for charging stations that are owned by separate entities (e.g., governments, corporations, utilities, apartment owner, etc.). These separate entities are referred to as charging station hosts ("hosts"). For example, the hosts may be provided an interface for viewing statistics on their charging stations (e.g., how much they have been used, how much energy has been transferred, etc.), etc. Software updates may also be provided through the network. Currently the hosts are required to use the price established by the electric vehicle charging service or allow charging for free.

BRIEF DESCRIPTION OF THE DRAWINGS

The invention may best be understood by referring to the following description and accompanying drawings that are used to illustrate embodiments of the invention. In the drawings:

FIG. 10 illustrates an exemplary host definable pricing interface that allows hosts to create and/or modify access lists according to one embodiment of the invention;

DETAILED DESCRIPTION

Figure 1:
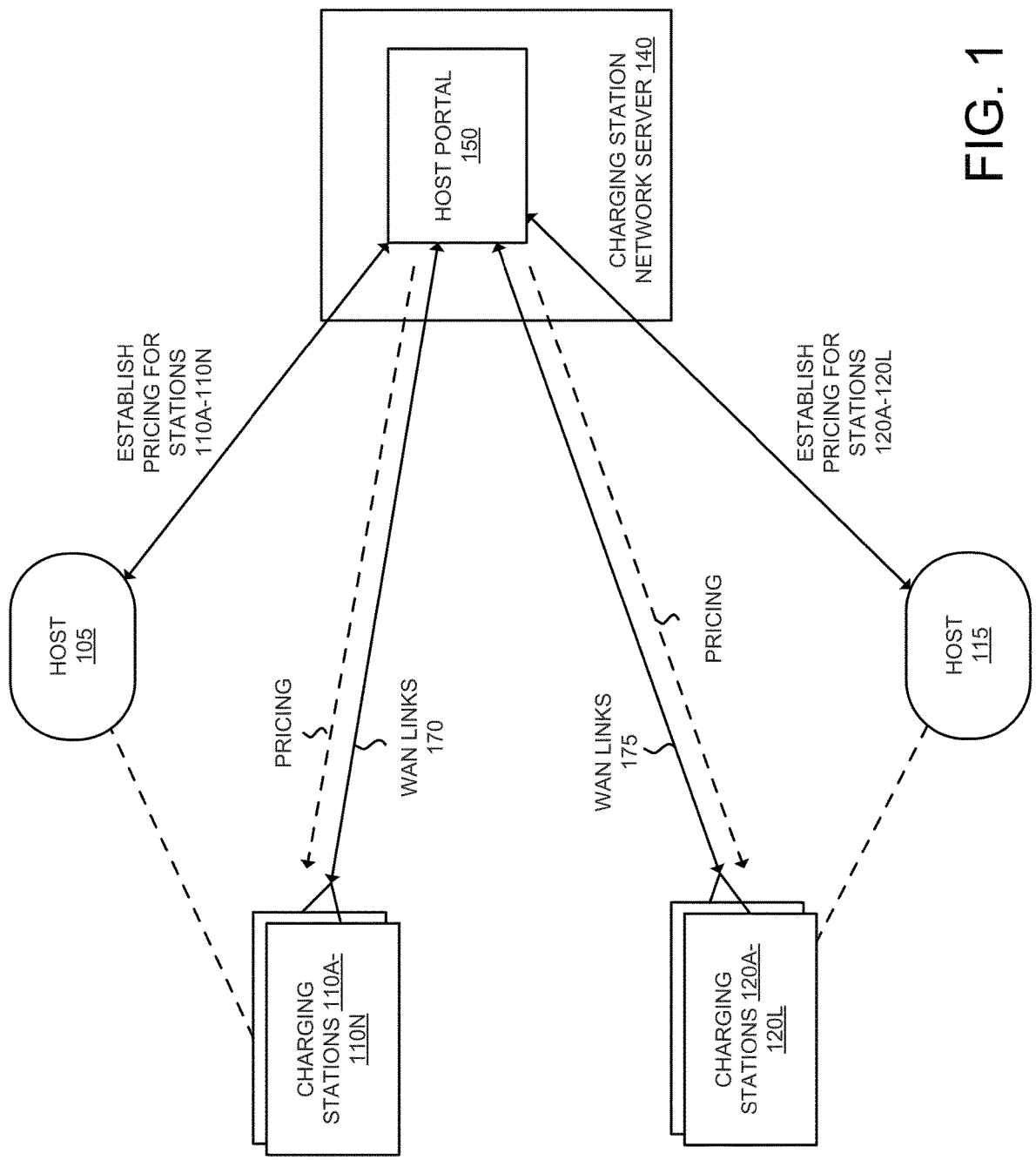
FIG. 1 illustrates an exemplary electric vehicle charging station network according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for charging station host definable pricing for charging electric vehicles is described. In one embodiment of the invention, charging station hosts, which control (e.g., own or lease), one or more charging stations (and sometimes an associated parking space), can define pricing for charging electric vehicles on their one or more charging stations through use of an interface provided by a charging station network operator through a charging station network server. The charging stations are networked with the charging station network server (hereinafter "server"). The charging station network operator (hereinafter "network operator"), is typically a separate entity from the host and operates the network portion of the system for the benefit of the hosts (typically for a fee). The network operator typically designs and sells the charging stations to the hosts. In some circumstances, the network operator is also a host.

The hosts configure their charging stations using an interface on the server (e.g., a host portal) provided by the network operator, including defining one or more prices for charging electric vehicles on their charging stations. The interface provides the host with the ability to flexibly define the price for charging electric vehicles on their charging stations based on several different pricing options and settings. For example, the hosts can establish prices for one or more of per charging session, per hour (or other length of time) elapsed during the charging session, and per amount of energy transferred (either consumed from a power grid or supplied to a power grid in a vehicle-to-grid (V2G)) (e.g., kilowatt-hour (kWh)) during the charging session that apply to one or more of their charging stations. In some embodiments, the host can define a price to use the charging station (and/or park in an associated space) based on a combination of the above (e.g., five dollars per hour plus forty cents per kWh to use the charging station and its associated parking space). In a vehicle-to-grid (V2G) environment, the total cost can be based on net energy transfer in which the electric vehicle operator will be debited or credited according to the prices set by the host. As used herein, a charging session is a limited period of time (that may be configured by the hosts using the host portal 150) in which energy may be transferred between an electric vehicle and a charging station.

The hosts can also use the interface to define pricing that is dependent on the time and/or date for one or more of their charging stations (e.g., daytime charging may have different price(s) than overnight charging, weekday charging may have different price(s) than weekend charging, holiday charging may have different price(s) than non-holidays, etc.). The hosts can also use the interface to define pricing for different electric vehicle operators (e.g., some electric vehicle operators may be exempt from payment, some electric vehicle operators may be required to pay a surcharge, some electric vehicle operators may pay a reduced rate, etc.) for one or more of their charging stations. The hosts can also use the interface to establish whether and/or when their charging stations should operate in open mode (e.g., allowing any electric vehicle operator access) or restricted mode (e.g., allowing only certain electric vehicle operators access). The hosts can also use the interface to define different prices for different charging stations and/or charging point connections (e.g., attached charging cord with a SAE J1772 connector, a NEMA (National Electrical Manufacturers Association) standards 5-15, 5-20, 14-50 or other standards (e.g., BS 1363, CEE7, etc.) compliant power receptacle, etc.). The hosts can also use the interface to define different prices for different amperages. For example, the hosts can use the interface to define a higher price for electric vehicles that draw a higher amperage amount (e.g., 60 Amps) relative to other electric vehicles that draw a lower amperage amount (e.g., 30 Amps).

The hosts can also use the interface to combine one or more of the above to flexibly define pricing schemes for their charging stations.

In one embodiment, sometime after a host has defined the pricing for charging electric vehicles on one or more of their charging stations, the server transmits the pricing to that charging station. The charging station interprets the pricing and can display appropriate price(s) for charging electric vehicles to potential customers.

FIG. 1 illustrates an exemplary electric vehicle charging station network according to one embodiment of the invention. The host 105 owns the charging stations 110A-110N and the host 115 owns the charging stations 120A-120L. Each of the hosts 105 and 115 may be a corporation, a utility, a government, an apartment/condo owner, or other entity that controls (e.g., owns or leases) charging stations. The charging stations 110A-110N and 120A-120L are coupled with the charging station network server (hereinafter "server") 140. The server 140 is owned and administered by a network operator (not illustrated) and is a different entity than at least one of the hosts 105 and 115. The network operator typically designs and sells the charging stations 110A-110N and 120A-120L.

The charging stations 110A-110N and 120A-120L provide charging service for electric vehicles. That is, electric vehicles can be charged through use of the charging stations 110A-110N and 120A-120L. In some embodiments, some of the charging stations are configured by a host to allow electric vehicle operators to pay for charging service per charging session, with the price of the charging session being defined by the host. In other embodiments, some of the charging stations are configured by a host to allow electric vehicle operators to pay for charging service based on the duration (amount of time) of a charging session, with the price being defined by the host. In other embodiments, some of the charging stations are configured by a host to allow electric vehicle operators to pay for charging service based on the amount of energy transferred (e.g., in kilowatt-hours (kWhs)) during a charging session, with the price being defined by the host. In yet another embodiment, some of the charging stations are configured by a host to allow the electric vehicle operators to select from two or more of the above (pay per session, pay per amount of time, pay per amount of energy transferred). Typically, the charging session length is configured such that the electric vehicle may be fully charged during that time. It should be understood that if the charging session extends over the defined length, a new charging session may be created and billed to the electric vehicle operator.

The charging stations 110A-110N and 120A-120L may be located in public places or private places, and may be configured by the hosts 105 and 115 respectively to operate in restricted mode (available only to certain electric vehicle operators) or open mode (available to all electric vehicle operators), which may vary depending on the time of day and/or date. For example, some charging stations may be configured to operate in restricted mode during the day (e.g., during the workday) and open mode during evening and overnight hours, or vice versa. In one embodiment, the charging stations that operate in restricted mode include a restricted list of identifiers (e.g., a whitelist) that identifies those electric vehicle operators which are allowed to use the charging station at that time.

The charging stations 110A-110N and 120A-120L may include different charging point connections. For example, some of the charging stations may include an attached charging cord with a SAE J1772 connector for charging electric vehicles while other charging stations may include a standard power receptacle (e.g. conforming to NEMA (National Electrical Manufacturers Association) standards 5-15, 5-20, 14-50 or other standards (e.g., BS 1363, CEE7, etc.) and may be operating at different voltages (e.g., 120V, 240V, 230V, etc.)). Still other charging stations may include both an attached charging cord and a power receptacle for charging electric vehicles (sometimes simultaneously).

Electric vehicle operators are typically required to be authorized in order to use a particular charging station and/or charging point connection. The authorization requirements may be different depending on the configuration of the charging station. For example, if a charging station is operating in open mode (available to all electric vehicle operators), authorization may include ensuring that payment for the charging service is properly authorized (e.g., using a valid credit card, valid pre-paid account with sufficient credits, valid subscription, etc.). As another example, if a charging station is operating in restricted mode, authorization may include determining whether the electric vehicle operator and/or the electric vehicle is allowed to use the charging station and may also include ensuring that payment for the charging service is properly authorized. For instance, an identifier (or a portion of an identifier) associated with the electric vehicle operator (e.g., an RFID tag associated with the electric vehicle operator, a username/password, an email address, a phone number, an address, a credit card number, account number, PIN (personal identification number), or any other identifying information associated with the electric vehicle operator) or the electric vehicle (e.g., a VIN (vehicle identification number)), which is hereinafter referred to as an "access identifier," may be checked against a list of identifiers authorized for access (e.g., a whitelist of identifiers) and/or against a list of identifiers not authorized for access (e.g., a blacklist of identifiers). In addition, payment authorization may include determining whether a credit card is valid, whether a pre-paid account associated with the identifier has sufficient credits for the charging service, whether a subscription account associated with the identifier is in good standing, etc.

The access identifiers may be presented differently to the charging stations depending on their type. For example, if the access identifier is an RFID tag, the electric vehicle operator may swipe/wave an RFID enabled device near an RFID reader of the charging station (or a payment station coupled with the charging station) to present the access identifier and request a charging session. As another example, if the access identifier is associated with the electric vehicle itself (e.g., the vehicle's VIN), the access identifier may be communicated to the charging station by the vehicle (e.g., through PLC (power line communication).

The charging stations 110A-110N and 120A-120L communicate with the server 140 over the WAN (Wide Access Connection) links 170 and 175 respectively. For example, the charging stations 110A-110N and 120A-120L exchange authentication request/reply messages with the server 140, transmit charging session data to the server 140, and may receive pricing from the server 140 over the links 170 and 175 respectively. The links 170 and 175 may be a cellular link (e.g., CDMA, GPRS, etc.), WiFi internet connection, Plain Old Telephone Service (POTS), leased line, etc. Although not illustrated in FIG. 1, in some embodiments one or more of the charging stations 110A-110N and 120A-120L may not directly communicate with the server 140 but communicate indirectly through a gateway device, which may be one of the charging stations 110A-110N and 120A-120L.

The server 140 typically performs authorizing and accounting procedures for the charging stations 110A-110N and 120A-120L. For example, in one embodiment, the charging stations 110A-110N and 120A-120L transmit an authorization request to the server 140 when authorizing electric vehicle operators. The authorization request includes one or more of a charging station identifier (which uniquely identifies the charging station) and the access identifier presented by the electric vehicle operator when initiating access to the charging station. The server 140 determines whether the access identifier is authorized for using the charging station, which may be dependent on the time of day and/or the date. If the access identifier is authorized, and payment is required, the server 140 performs a payment authorization procedure to determine whether proper payment credentials have been presented (e.g., whether a credit card has been accepted, whether there is sufficient credit on a pre-paid account associated with the access identifier, whether there is a valid subscription associated with the access identifier, etc.). The server 140 transmits an authorization reply back to the charging station which then allows or disallows use of the charging station.

The charging stations 110A-110N and 120A-120L may not be energized until authorization is complete and successful. For example, the charging stations may include a current control device that controls the electric current available for charging electric vehicles and does not allow charging until authorization is complete and successful.

Some of the charging stations 110A-110N and 120A-120L may not require an authorization procedure to be performed as a prerequisite to allowing electric vehicle operators to use the charging stations. For example, some of the charging stations 110A-110N and 120A-120L may be configured to operate in open mode (available to all electric vehicle operators) and allow for free charging (no payment required) or allow for payment to be made after a charging session ends.

In some embodiments, since the hosts 105 and 115 establish the pricing for using the charging stations 110A-110N and 120A-120L respectively, the commercial transactions are between the electric vehicle operators and the hosts 105 and 115. For example, the hosts 105 and 115 may each sell charging service subscription plans to electric vehicle operators. While the commercial transactions are between the electric vehicle operator and the hosts, the server 140 may provide billing functionality on behalf of the hosts 105 and 115. For example, the server 140 may provide support to accept and process payments of multiple types for charging service (e.g., standard credit cards, RFID credit cards, pre-paid cards, or other payment types). The server 140 may credit or bill the account of a host accordingly.

The charging stations 110A-110N and 120A-120L typically transmit charging session data during, or after completion of a charging session, to the server 140 for accounting and billing. The charging session data may include one or more of a charging station identifier, a charging connection type, the access identifier of the charging session, the charging session start time, the charging session stop time, and the amount of energy consumed by an electric vehicle of an electric vehicle operator during the charging session (which may be a net amount if some amount of electricity was transferred to the power grid in a V2G environment). The accounting and billing may also be performed prior to a charging session commencing (i.e., prior to energy being consumed by an electric vehicle). For example, if the electric vehicle operator is using a pre-paid account and is paying per session, the total cost (depending on the price established by the host) will be deducted from that pre-paid account (e.g., withdrawn from a vehicle operator's account) and placed into an account for the host (or other holding account until at least a certain amount of energy is transferred). As another example, if the electric vehicle operator is paying using a pre-paid account and is paying per hour, the total cost (depending on the price established by the host and the duration of the charging session) will be deducted from that pre-paid account and placed into an account for the host (or other holding account until at least a certain amount of energy is transferred).

The server 140 includes a host portal 150, which is accessible to the hosts 105 and 115 over the Internet or other network connection. In one embodiment the host portal 150 is a website accessed through a web browser while in other embodiments the host portal 150 is accessed through a command line interface or other interface. The host portal 150 allows the hosts 105 and 115 to configure their charging station(s) and perform other functions, including defining, for each of the charging stations 110A-110N and 120A-120L respectively, the pricing for electric vehicle charging service.

In one embodiment, the host portal 150 allows the hosts 105 and 115 to configure, for each of their charging stations and/or charging point connections, the charging payment options allowed on that charging station and/or charging point connection (e.g., whether that charging station and/or charging point connection is allowed to accept payment based on per charging session basis, based on the amount of time elapsed during a charging session, based on the amount of energy transferred during a charging session, or any combination of the same).

The host portal 150 allows the hosts 105 and 115 to define, for each of their charging stations and/or charging point connections, one or more of a price per charging session, a price per amount of time elapsed during a charging session (e.g., per minute, per hour, etc.), and a price per amount of energy transferred during a charging session (e.g., per kilowatt-hour (kWh)). The host portal 150 allows these prices to be set differently depending on time of day and/or date. In addition, the host portal 150 allows these prices to be set differently depending on the type of payment (e.g., paying with a credit card may be more expensive than paying with a pre-paid card, etc.).

In some embodiments, the host portal 150 allows the hosts 105 to 115 to define the type(s) of payment that can be accepted at their charging stations (e.g., standard credit cards, contactless credit cards, pre-paid accounts, smartcards, cash, near field communication, etc.). This may be dependent on one or more of: time of day, date, identity of the electric vehicle operator, charging point connection type, and charging session payment type (e.g., one or more of per session, per amount of time, and per amount of energy).

In one embodiment, the host portal 105 allows the hosts 105 and 115 to define prices that differ depending on the identity of the vehicle operator using the charging station (which also may be different based on time of day and/or date). For example, electric vehicle operators that are members of a charging service provided by a host may pay a smaller amount for charging using one of the charging stations of the host, while electric vehicle operators that are not members of that charging service may have to pay a surcharge when charging using one of those charging stations. As another example, a host that controls a fleet of electric vehicles (e.g., a municipality) may define a set of prices for public charging (electric vehicle operators that are not part of the fleet) and define a different set of prices for fleet charging that are applicable to the fleet electric vehicle operators.

In one embodiment, the host portal 150 also allows the hosts 105 and 115 to exempt certain electric vehicle operators from payment. This may also be dependent on the time of day and/or date and be specific to a charging station and/or charging point connection of a charging station. For example, during working hours, a host may exempt its employees from paying for service (while others may have to pay for service), while during non-working hours the host may require each vehicle operator to pay for charging service.

In some embodiments, the host portal 150 allows the hosts to specify, for each of their charging stations, the restricted status of that charging station (e.g., whether the charging station should be in restricted mode or open mode, and/or when the charging station should be in restricted mode or open mode). In addition, the host portal 150 allows the hosts to specify, for each of their charging stations and/or charging point connections on those charging stations, one or more vehicle operators that are allowed to use that charging station and/or charging point connection during restricted mode (e.g., a whitelist) and/or are not allowed to use that charging station and/or charging point connection during restricted mode (e.g., a blacklist). These lists may be transmitted to the appropriate charging stations or be maintained on the server 140. In some embodiments, the host portal 150 allows the hosts to establish a surcharge (premium price) for allowing electric vehicle operators that are otherwise not allowed to use the charging station while in restricted mode to use the charging station.

Figure 2:
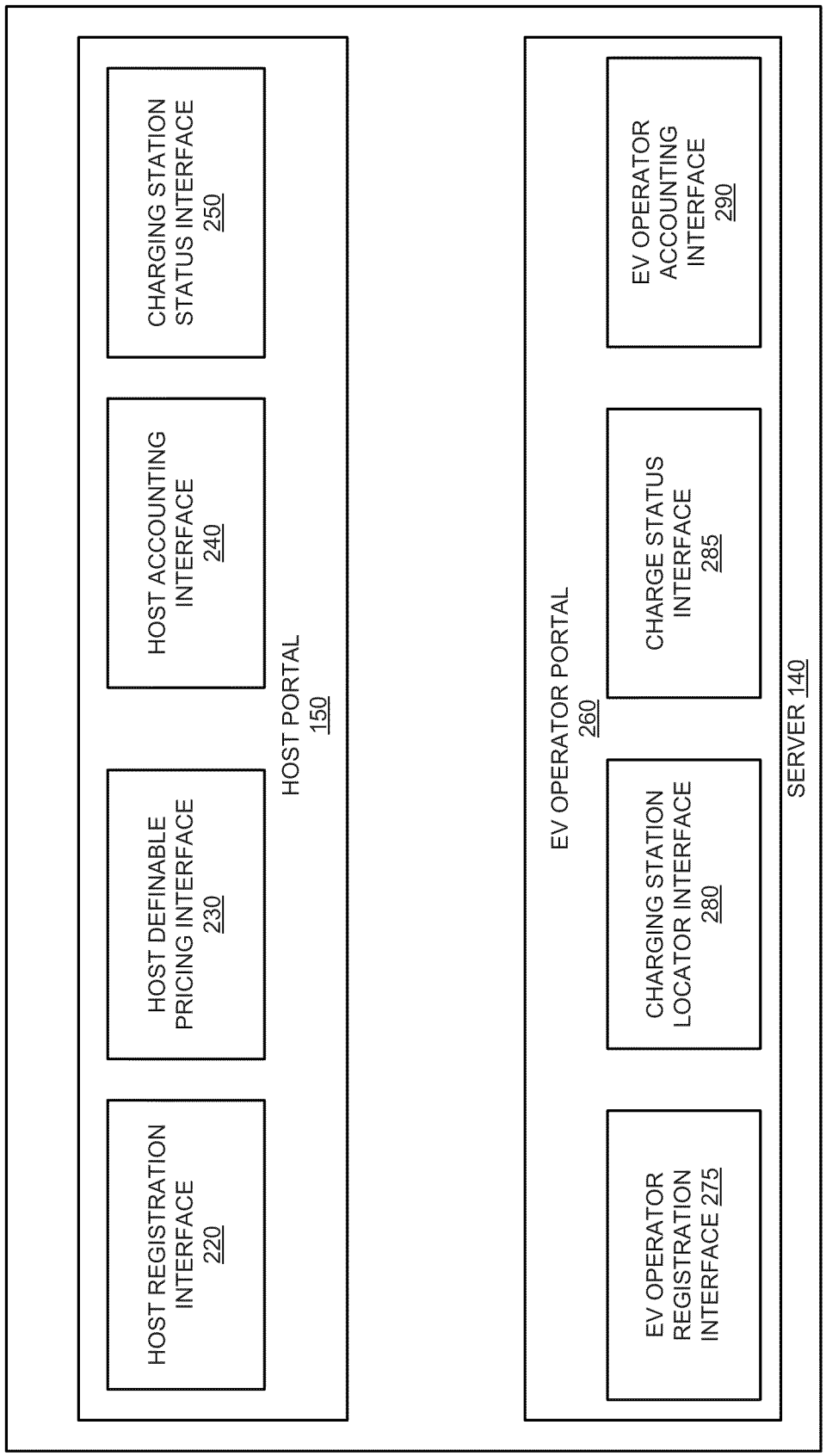
FIG. 2 illustrates exemplary portals of the charging station network server of FIG. 1 according to one embodiment of the invention.

As described above, the hosts 105 and 115 may use the host portal 150 of the server 140 when configuring host definable pricing. In addition to the host portal 150, the server 140 also includes additional portals. For example, FIG. 2 illustrates exemplary portals of the server 140 including the host portal 150 and the electric vehicle operator portal 260. As illustrated in FIG. 2, the host portal 150 includes the host registration interface 220, the host definable pricing interface 230, the host accounting interface 240, and the charging station status interface 250. Although not illustrated in FIG. 1 or 2, it should be understood that the server 140 includes a database (or accesses a remote database) or other storage mechanism that stores charging station configuration data, charging session data, host account information, electric vehicle operator account information, and other information.

The host registration interface 220 allows hosts to register for service with the server 140 including registering their charging station(s) with the server 140. For example, the host registration interface 220 allows hosts to provide contact information (e.g., name, company, address, email address(es), telephone number(s), charging station serial numbers, etc.). Although not illustrated, it should be understood that the host portal is restricted to hosts having proper credentials typically established during registration (e.g., username/password, etc.). In some embodiments, a third party may register the stations on behalf of the host. Such third parties may include an installer accessing an Installer Portal, or the network operator accessing a Network Operator Portal.

The host accounting module 240 allows hosts to review accounting information (e.g., energy transferred through each of their charging station(s), total amount of energy transferred from the power grid by each of their charging station(s) over a give time period, total power transferred to the power grid by the charging station(s) over a given time period, account balances, payment and invoices, etc.).

The charging station status module 250 allows hosts to view the charging status of each of their charging station(s) (e.g., present status (charging, available, out-of-service), reports on occupancy rates of their charging station(s), reports on energy usage for each of their charging station(s), etc.).

After registering their charging station(s) for service, the hosts may configure certain settings and preferences on those charging stations (e.g., establishing pricing specifications for those charging stations). The hosts may assign names or other unique identifying information to the charging stations. The hosts may also create a group of charging stations which typically will have the same configuration (e.g., same pricing specifications, same restricted status, etc.). Although not illustrated, a database on the server 140 (or remotely accessible by the server 140) maintains a list of charging stations for each of the hosts (e.g., by charging station serial number).

The host definable pricing interface 230 allows the hosts 105 and 115 to establish, for each of the charging stations 110A-110N and 120A-120L and/or charging station connections respectively, the price(s) for charging electric vehicles using those charging stations and/or charging station connections. As described above, the host definable pricing interface 230 allows hosts to flexibly establish pricing for charging service using their charging stations. Thus the host definable pricing interface 230 provides several different pricing options for which the hosts can configure. For example, for each charging station and/or charging station connection, a host can configure a price for each charging session, a price per amount of time charging, and a price per amount of energy transferred (e.g., kWh). The host definable pricing interface 230 also allows the hosts to set different prices based on time of day and/or date. The host definable pricing interface 230 also allows the hosts to set different prices for different electric vehicle operators.

The host definable pricing interface 230 allows each host to select one or more of their charging stations for creating or modifying a pricing specification for those charging stations. The pricing specification applied to a charging station defines how the cost of charging sessions using that charging station are calculated. The selection may be performed differently in different embodiments. For example, in one embodiment, the host is presented with a list of their charging stations that can be selected for establishing pricing, which may include group(s) of charging stations if configured. In another embodiment, the hosts can enter a charging station serial number or other identifier of one or more charging stations to create or modify a pricing specification for those charging stations. In another embodiment, the host definable pricing interface 230 includes, or uses, an interactive map module that allows the hosts to graphically view and select one or more of their charging stations for configuring pricing specifications.

The host definable pricing interface 230 includes, or uses, a calendaring module when establishing different prices based on time of day and/or date. In one embodiment the calendaring module is coupled with historical data for each of the charging stations that indicates historical use of the charging station. The hosts may use this historical data to determine periods of high demand and low demand and set pricing accordingly (e.g., the hosts may increase the price for periods of higher demand and decrease the price for periods of lower demand).

The host definable pricing interface 230 also allows the hosts to globally change one or more of their prices for the charging stations. For example, a host may globally increase or decrease one or more of their prices for their charging stations or a group of selected charging stations.

In one embodiment, the host definable pricing interface 230 allows the host to create pricing templates that can be established once and be used to configure pricing on one or more charging stations and/or charging point connections (including charging stations that the host may purchase in the future). Different pricing templates may be created for different situations (e.g., a template for free charging, a template for private charging, a template for daytime charging, a template for overnight charging, etc.).

In one embodiment, the host definable pricing interface 230 allows the pricing to be established as a dynamic percentage relative to the cost of the electricity to the host (e.g., ten percent over the cost of the electricity to the host) such that if the cost of electricity to the charging station increases/decreases the pricing for charging electric vehicles on that charging station can correspondingly increase/decrease.

After the price(s) are established for charging service for a charging station, the host definable pricing interface 230 creates a corresponding pricing specification for that charging station. The pricing specifications are transmitted to the appropriate charging stations.

Figure 3:
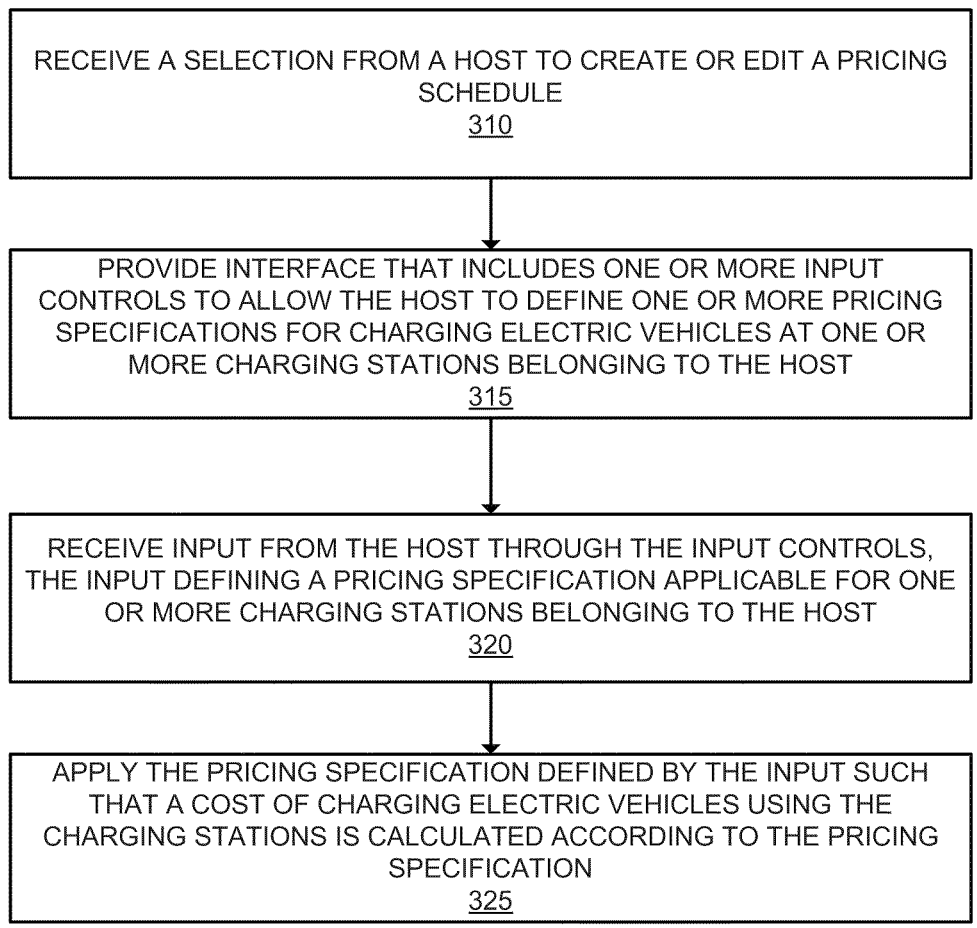
FIG. 3 is a flow diagram illustrating exemplary operations for electric vehicle charging station host definable pricing according to one embodiment of the invention.

FIG. 3 is a flow diagram illustrating exemplary operations for electric vehicle charging station host definable pricing according to one embodiment. FIG. 3 will be described with reference to the exemplary embodiment of FIG. 1; however it should be understood that the operations described in reference to FIG. 3 can be performed by embodiments other than those discussed in reference to FIG. 1 and the embodiments discussed with reference to FIG. 1 can perform operations different than that described in reference to FIG. 3.

At block 310, the host portal 150 receives a selection from a host to define or edit pricing for electric vehicle charging service provided through one or more of their charging stations. By way of example, the host accesses a portion of the host portal 150 for defining or editing pricing for electric vehicle charging service. Flow moves from block 310 to block 315.

At block 315, the host portal 150 provides a set of one or more input controls to allow each host to define one or more pricing specifications for charging electric vehicles at one or more charging stations belonging to that host. For example, the input controls can include pricing controls (e.g., a pricing field to set the price per charging session, a pricing field to set the price per amount of time (e.g., per hour) elapsed during the charging session, and a pricing field to set the price per amount of energy transferred (e.g., kWh) during the charging session). As previously described, the pricing may further be defined based on the time of day and/or date. Thus in addition to the pricing controls, in some embodiments the input controls provided to the hosts include time of day input fields to allow the hosts to set time periods that prices will apply, and/or day/date fields to allow the hosts to set days/dates that prices will apply (e.g., weekdays, weekends, holidays, custom date and time, etc.). In addition, the hosts may further define the pricing based on the identifier presented during the charging session request (by the electric vehicle operator). Thus in some embodiments, the input controls also include an access identifier control to allow the hosts to provide one or more identifiers that certain price(s) (and possibly time of day and/or date restrictions) will be applicable for. For example, a host that controls a fleet of electric vehicles (e.g., a municipality) may define a set of prices for public charging (electric vehicle operators that are not part of the fleet) and define a different set of prices for fleet charging that are applicable to the fleet electric vehicle operators. In addition, the hosts may further define the pricing for charging service based on the type of charging point connection. For example, the hosts may define separate prices for separate charging point connections. Thus in some embodiments, the input controls also include a charging point connection input control to allow the hosts to define pricing for separate charging point connections.

Flow moves from block 315 to block 320, where the host portal 150 receives input from the host through the input controls, where the input defines a pricing specification for one or more charging stations belonging to the host. At a minimum, the input includes a price for electric vehicle charging service that is to be applied to one or more charging stations. However, the input can also include multiple prices to be applied to different charging stations. The input can also include one or more prices based on charging session payment type (e.g., per charging session, per amount of time (e.g., per hour) elapsed during the charging session, per amount of energy consumed during the charging session, etc.) applicable for one or more charging stations. The input can also indicate time of day(s) and/or date(s) that certain prices may apply for one or more charging stations. The input can also indicate one or more prices for certain access identifiers (and may further be based on time of day and/or date) for one or more charging stations. The input can also indicate one or more prices specific to one or more charging point connections. It should be understood that the above are examples of the input and the host may flexibly combine different types of input to define the pricing for electric vehicle charging service.

Flow then moves to block 325, where the host portal 150 causes the pricing specification defined by the host through the input for the one or more charging stations to be applied such that the cost of charging sessions using those charging stations is calculated according to the pricing specification defined by the host. For example, the server uses the defined pricing specification when performing accounting for the charging sessions of the charging station.

In one embodiment, the defined pricing specification is transmitted to the appropriate charging stations. For example, with reference to FIG. 1, if the host 105 defines pricing for electric vehicle charging service provided through the charging station 110A, the server 140 may transmit the pricing to that charging station 110A. The charging stations may display the pricing to potential customers.

In some embodiments, the pricing specifications are generated based on time based pricing profiles and access lists. In one embodiment, the hosts use the host definable pricing interface 230 to create and/or modify one or more time based pricing profiles, create and/or modify one or more access lists, create and/or modify one or more pricing specifications (using the time based pricing profile(s) and access list(s)), and apply the pricing specifications to selected charging station(s) and/or charging point connection(s).

Figure 4:
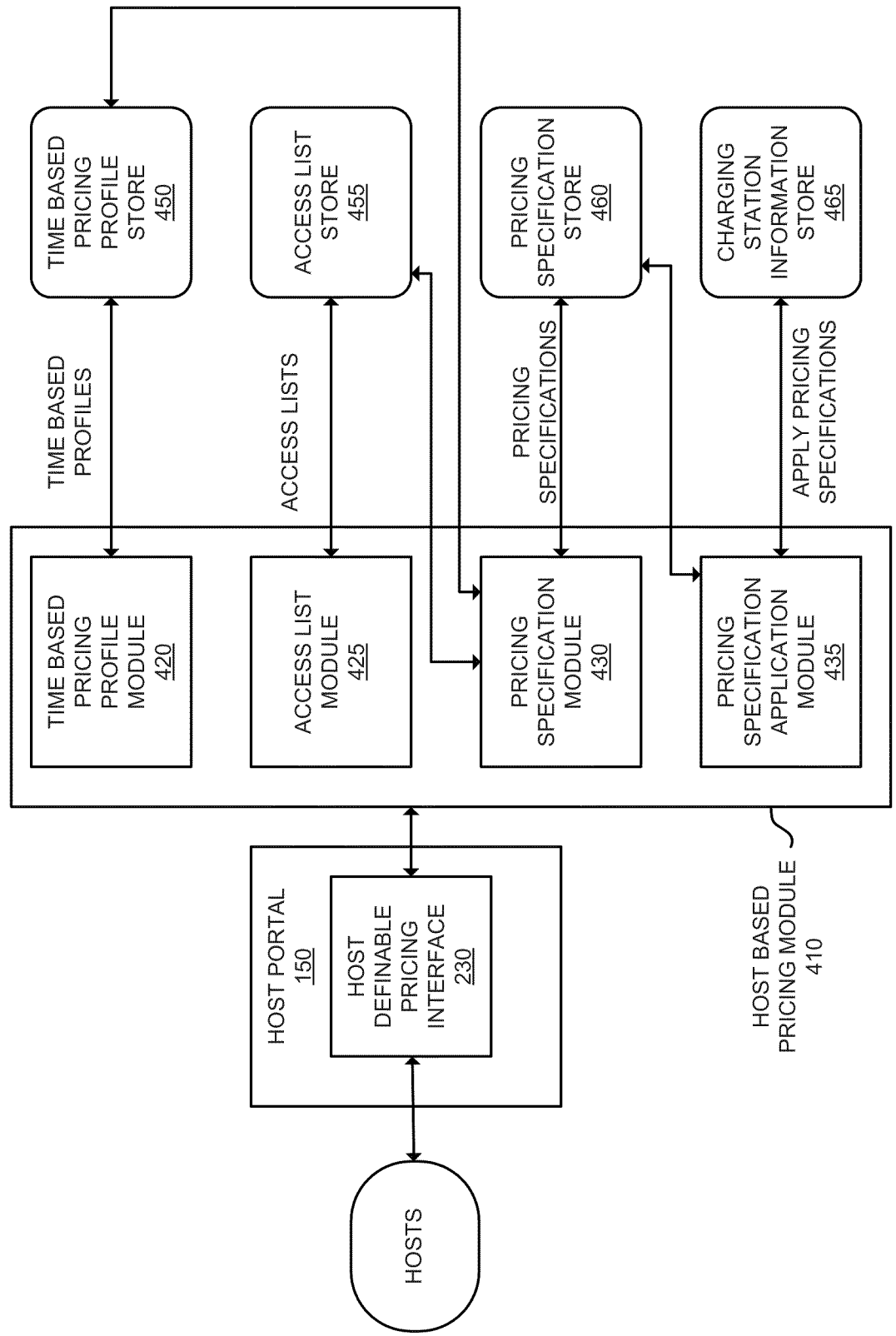
FIG. 4 is a block diagram illustrating the functionality of an exemplary host definable pricing interface of the server in one embodiment of the invention.

FIG. 4 is a block diagram illustrating the functionality of an exemplary host definable pricing interface of the server 140 in one embodiment. As illustrated in FIG. 4, the host definable pricing interface 230 uses the host definable pricing module 410 when providing the capability for the hosts to establish pricing specifications through the host portal 150. The host definable pricing module 410 includes the time based pricing profile module 420, the access list module 425, the pricing specification module 430, and the pricing specification application module 435.

Figure 5:
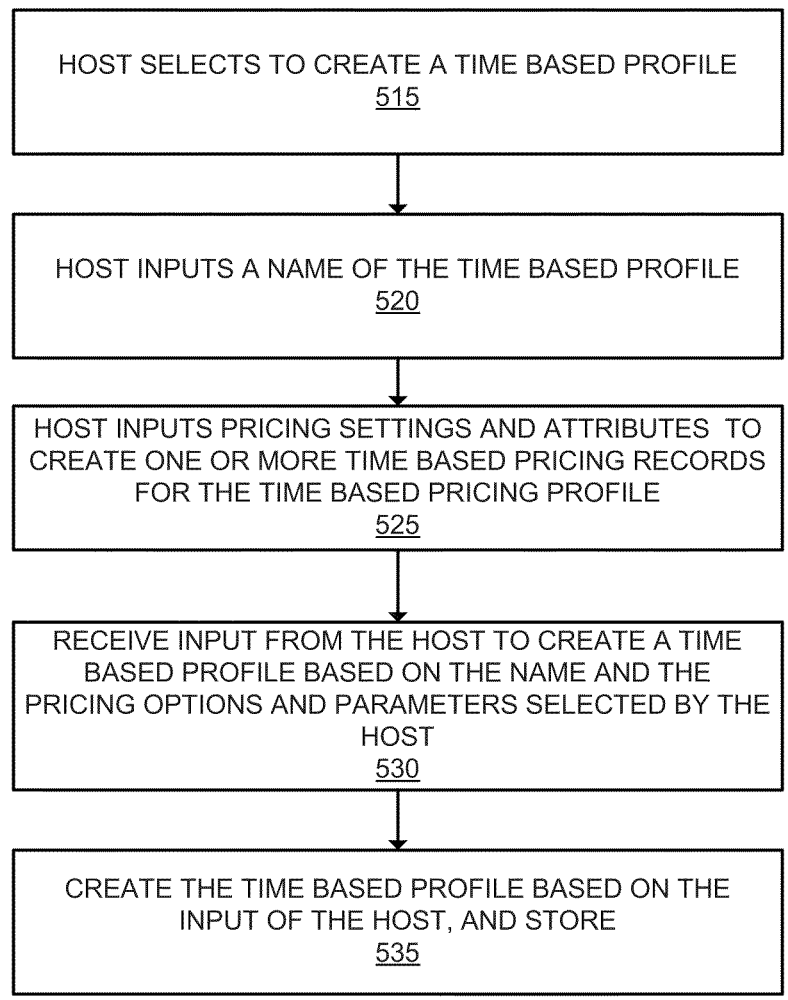
FIG. 5 is a flow diagram illustrating exemplary operations for establishing a time based profile based on input from a host through a host definable pricing interface according to one embodiment of the invention.
Figure 9:
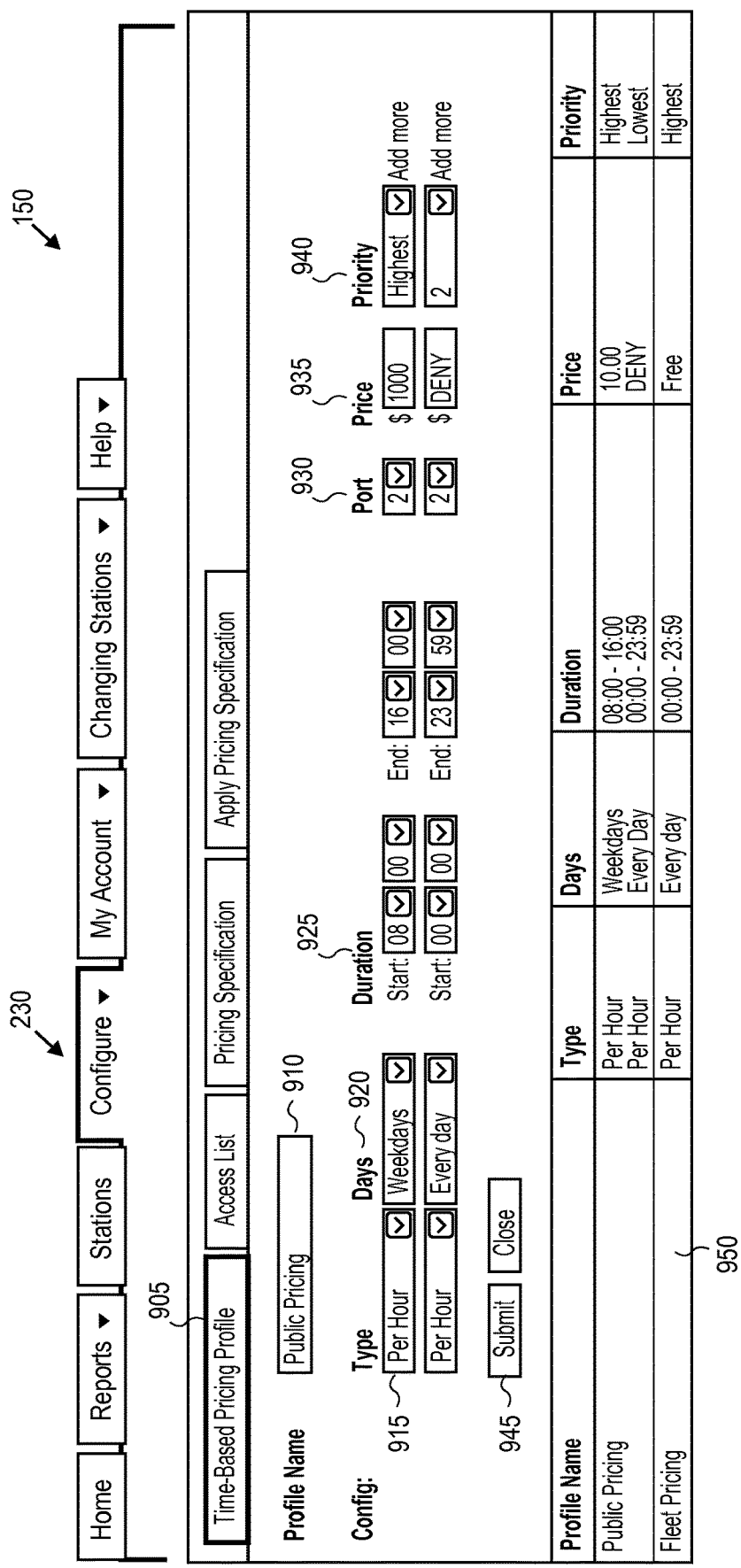
FIG. 9 illustrates an exemplary host definable pricing interface for creating and/or modifying time based pricing profiles according to one embodiment of the invention.

The time based pricing profile module 420 creates and/or modifies time based profiles, which are stored in the time based pricing profile store 450, based on the input of the hosts. A time based pricing profile defines one or more prices for one or more time periods (e.g., weekdays, weeknights, weekends, holidays, all time, and/or a customized time and/or date range). Each time based pricing profile may include one or more time based pricing records. Each time based pricing record includes a single price for a single charging session payment type (per session, per amount of time, per amount of energy transferred, or a combination of the same (e.g., ten dollars an hour plus forty cents per kWh)) for an identified period of time including which day(s) and when the price will apply. FIG. 5 is a flow diagram illustrating exemplary operations for establishing a time based profile based on input from a host. FIG. 5 will be described in reference to the exemplary embodiments of FIGS. 4 and 9; however it should be understood that the operations described in reference to FIG. 5 can be performed by embodiments other than those discussed with reference to FIGS. 4 and 9; and exemplary embodiments described in reference to FIGS. 4 and 9 can perform operations other than those discussed with reference to FIG. 5. FIG. 9 illustrates an exemplary host definable pricing portion 230 of the host portal 150 that allows hosts to create and/or modify time based pricing profiles.

With reference to FIG. 5, at block 515, the host selects to create a time based profile using the host definable pricing interface 230. With respect to FIG. 9, the host has selected the time based pricing profile tab 905, which causes a number of options to be displayed to the host. Flow moves from block 515 to 520, where the host inputs a name of the time based profile in the time based profile name field 910. The time based profile name is used by the hosts as a way to quickly identify time based pricing profiles. For example, existing profiles are displayed to the user in the table 950. In some embodiments the time based pricing profile name is optional or a default name is used if the host does not provide one.

Flow moves from block 520 to block 525, where the host inputs pricing settings and attributes in the host definable pricing interface 230 to create one or more time based pricing records for the time based pricing profile including one or more prices for one or more time periods. The host definable pricing interface 230 illustrates several different options for the host to select and configure. The charging session payment type field 915 allows the host to select between multiple charging session payment types to set the price for (e.g., per amount of energy consumed (e.g., kWh), per amount of time (e.g., per hour), per charging session). The days field 920 allows the host to select the days for which the price will apply (e.g., every day, weekdays, weekends, holidays, or custom date range). The duration field 925 allows the host to select the time period the price will apply. The port field 930 allows the host to select which port (charging point connection) the price will apply. The price field 935 allows the host to set the price, and the priority field 940 allows the host to set the priority of the time based pricing record being created. The higher priority time based pricing records will take precedence over lower priority pricing records (e.g., when calculating the cost of the charging session).

Flow moves from block 525 to block 530, where the host definable pricing interface 230 receives input from the host to create a time based profile based on the name and pricing settings and attributes input by the host. For example, the host has selected the submit button 945. Flow then moves to block 535 where the time based pricing profile module 420 creates the time based profile based on the input of the host and stores the time based profile in the time based profile store 450. While FIGS. 5 and 9 illustrate creating a time based pricing profile, it should be understood that the host definable pricing interface 230 (or a similar interface) may be used to modify existing time based pricing profiles.

As illustrated in FIG. 9, there are two time based pricing profiles: a Public Pricing time based pricing profile and a Fleet Pricing time based profile. The Public Pricing time based pricing profile has two time based pricing records; the highest priority record being applicable during weekdays between 8:00 and 16:00 with a price of $10.00 per hour, and the lowest priority record being applicable during all days at all times with a price of DENY. Thus, the Public Pricing time based pricing profile will not allow charging on weekends or on weekdays between 00:00-07:59 and 16:01-23:59. The Fleet Pricing time based profile includes a single time based pricing record that is applicable every day at all times, and the price is free.

The access list module 425 creates and/or modifies access lists, which are stored in the access list store 455, based on the input of the hosts. An access list defines who can use a particular charging station or charging station connection. Each access list may include identifiers (or identifier subsets and/or use of wildcards) of access identifiers that are allowed to use the charging station, or may include identifiers (or identifier subsets and/or use of wildcards) of access identifiers that are not allowed to use the charging station. As will be described in greater detail in reference to the pricing specification module, the host can associate an access list with a time based pricing profile such that the time based pricing profile applies only to those identifier(s) as indicated by the access list.

Figure 6:
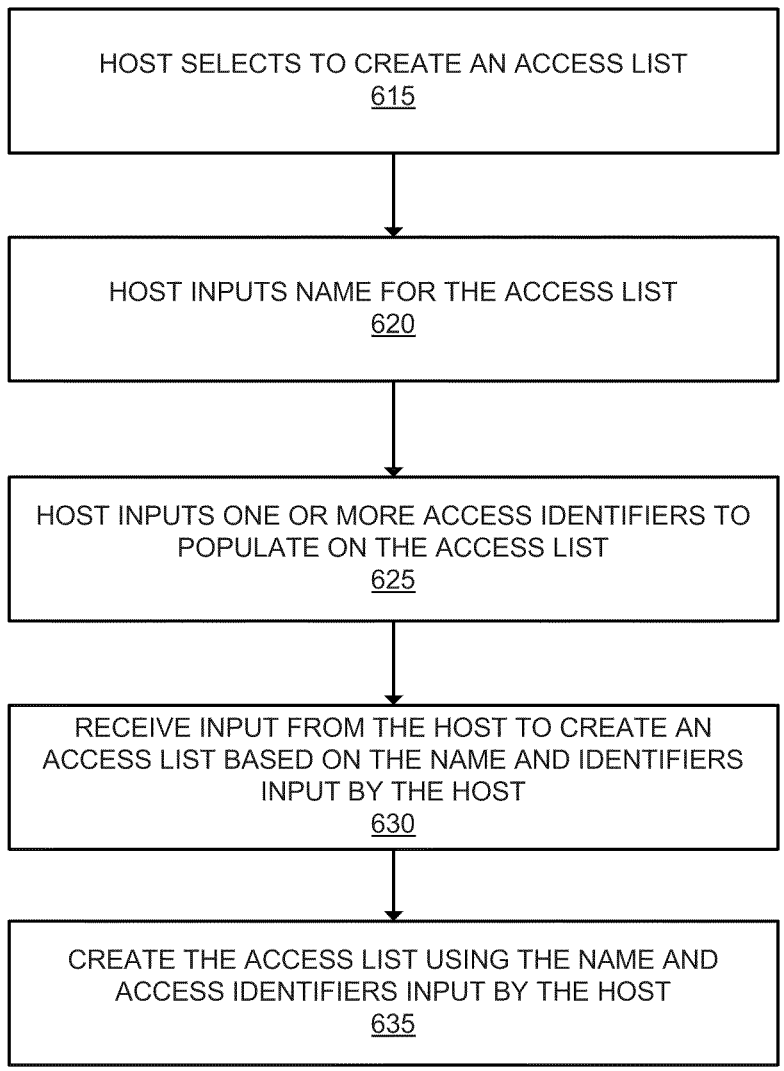
FIG. 6 is a flow diagram illustrating exemplary operations for establishing an access list based on input from a host through the host definable pricing interface according to one embodiment of the invention.

FIG. 6 is a flow diagram illustrating exemplary operations for establishing an access list based on input from a host through the host definable pricing interface 230. FIG. 6 will be described in reference to the exemplary embodiments of FIGS. 4 and 10; however it should be understood that the operations described in reference to FIG. 6 can be performed by embodiments other than those discussed with reference to FIGS. 4 and 10; and exemplary embodiments described in reference to FIGS. 4 and 10 can perform operations other than those discussed with reference to FIG. 6. FIG. 10 illustrates an exemplary host definable pricing portion 230 of the host portal 150 that allows hosts to create and/or modify access lists.

With reference to FIG. 6, at block 615, the host selects to create an access list using the host definable pricing interface 230. With reference to FIG. 10, the host has selected the access list tab 1005, which causes a number of access list options to be displayed to the host. Flow moves from block 615 to block 620, where the host inputs a name of the access list in the access list name field 1010. The access list name is used by the hosts as a way to quickly identify access lists. For example, existing access lists are displayed to the user in the table 1040. In some embodiments the access list name is optional or a default name is used if the host does not provide one. As illustrated in FIG. 10, there are two access lists displayed in the table 1040.

Flow moves from block 620 to block 625, where the host inputs one or more access identifiers to populate the access list. With reference to FIG. 10, the host inputs a number of access identifiers in the access identifier field 1020. It should be understood that wildcards may be input in the access identifier field 1020. For example, the access identifier input 1234* would include all access identifiers that begin with 1234. Each access identifier may be an RFID number, a username/password, an email address, a phone number, a street address, a credit card number, an account numbers, PIN, a combination of the same, or any other identifying information associated with an electric vehicle operator or account, or may be an identifier associated with the electric vehicle (e.g., the vehicle's VIN). The host may also use the access type field 1015 to set whether the access list includes identifiers that are allowed to use the charging station (e.g., a whitelist of identifiers) or whether it includes identifiers that are not allowed to use the charging station (e.g., a blacklist of identifiers). Of course it should be understood that the host may input access identifiers differently than manually inputting identifiers. For example, in some embodiments the host definable pricing interface 230 of the host portal 150 includes the ability for the host to submit a file of identifiers (e.g., a comma separated value file, a tab separated value file, a spreadsheet, etc.).

Flow moves from block 625 to block 630, where the host definable pricing interface 230 receives input from the host to create an access list based on the name and identifier(s) input by the host. Flow then moves to block 635, where the access list module 425 creates the access list using the name and access identifiers input by the host, and stores the access list in the access list store 455. While FIGS. 6 and 10 illustrate creating an access list, it should be understood that the host definable pricing interface 230 (or a similar interface) may be used to modify existing access lists.

The pricing specification module 430 creates and/or modifies pricing specifications, which are stored in the pricing specification store 460. A pricing specification defines which time based pricing profile should be applied to which access list. Each pricing specification may include one or more pricing specification records. Each pricing specification record includes a mapping or association between a single time based pricing profile and a single access list. Thus each pricing specification record defines when and what prices should apply (through the time based pricing profile) and defines who those prices should apply to (through the access list).

Figure 7:
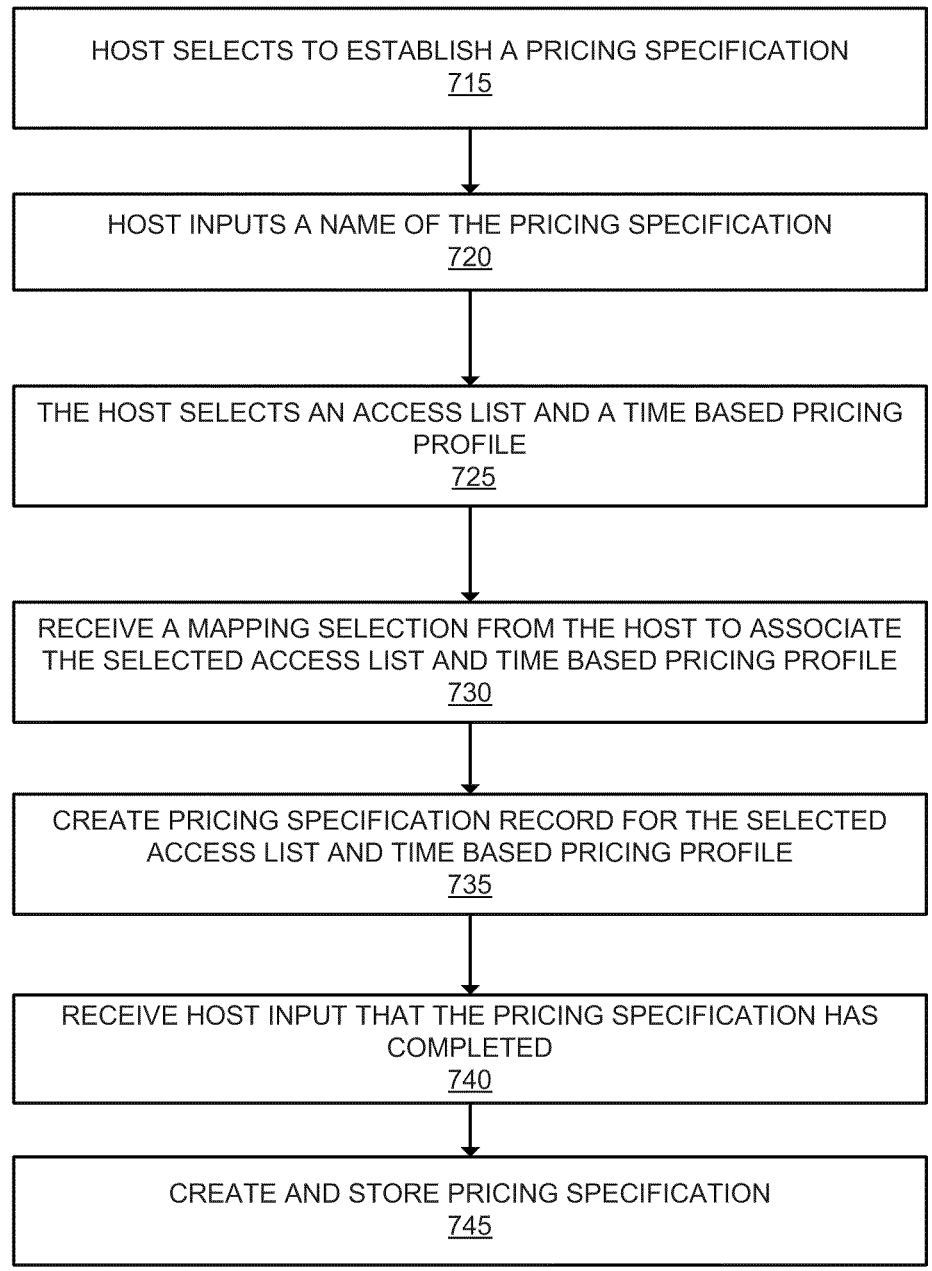
FIG. 7 is a flow diagram illustrating exemplary operations for establishing a pricing specification through use of a host definable pricing interface according to one embodiment of the invention.
Figure 11:
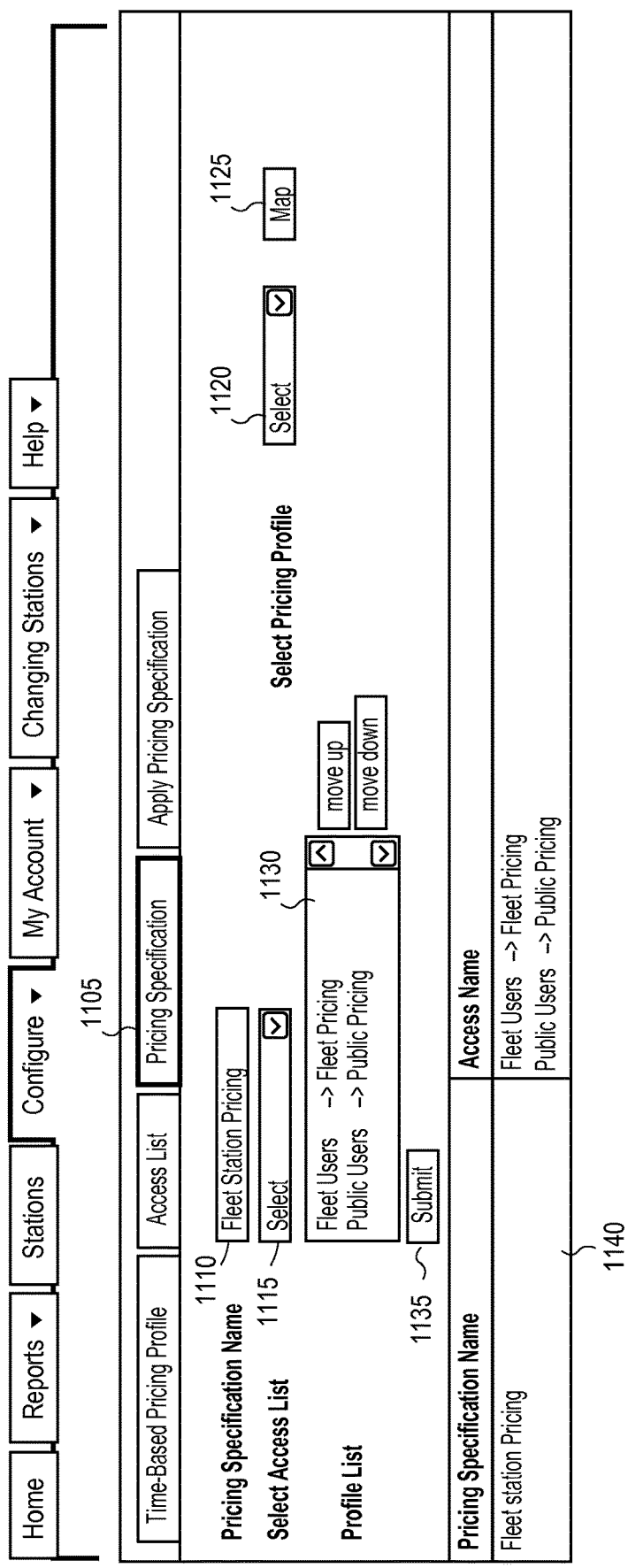
FIG. 11 illustrates an exemplary host definable pricing interface that allows hosts to create and/or modify pricing specifications according to one embodiment of the invention.

FIG. 7 is a flow diagram illustrating exemplary operations for establishing a pricing specification through use of a host definable pricing interface according to one embodiment. FIG. 7 will be described in reference to the exemplary embodiments of FIGS. 4 and 11; however it should be understood that the operations described in reference to FIG. 7 can be performed by embodiments other than those discussed with reference to FIGS. 4 and 11; and exemplary embodiments described in reference to FIGS. 4 and 11 can perform operations other than those discussed with reference to FIG. 7. FIG. 11 illustrates an exemplary host definable pricing interface 230 of the host portal 150 that allows hosts to create and/or modify pricing specifications according to one embodiment.

With reference to FIG. 7, at block 715, the host selects to create a pricing specification using the host definable pricing interface 230 of the host portal 150. With respect to FIG. 11, the host has selected the pricing specification tab 1105, which causes a number of options to be displayed. Flow moves from block 715 to block 720, where the host inputs a name for the pricing specification. The pricing specification name is used by hosts as a way to quickly identify pricing specifications (e.g., when applying the pricing specifications to the charging stations and/or charging point connections). For example, existing pricing specifications are displayed to the host in the table 1140. In some embodiments the pricing specification name is optional or a default name is used if the host does not provide one.

Flow moves from block 720 to 725, where the host selects an access list and a time based pricing profile. With respect to FIG. 11, the host selects an access list from the access list field 1115 (which is populated with access lists the host has previously created and/or default access lists (e.g., all)), and selects a time based pricing profile from the time based pricing profile field 1120 (which is populated with time based pricing profiles the host has previously created and/or default time based pricing profiles (e.g., free charging)). Flow then moves to block 730, where the pricing specification module 430 receives a mapping selection input from the host to associate the selected access list and time based pricing profile. For example, with reference to FIG. 11, the host has selected the map button 1125. Flow then moves to block 735, where the pricing specification module 430 creates a pricing specification record for the pricing specification for the selected access list and time based pricing profile.

Each pricing specification may include multiple pricing specification records. However, in some embodiments, an access list can only be used once in a given pricing specification. In such embodiments, after an access list is represented in a pricing specification record, it will not be an option for the host to select in the access list field 1115. If there are multiple pricing specification records, the host can move the records in the priority field 1130 up or down to assign a relative priority level. A higher priority pricing specification record will take precedence over a lower priority specification record. For example, it is possible for an access identifier to appear in multiple pricing specification records. For example, with reference to FIG. 10, the access identifiers in the Fleet Users access list are also included in the Public Users access list which includes all identifiers (represented by a wildcard). Referring back to FIG. 11, the Fleet Users access list is in a record that has a higher priority than the Public users access list. Thus, those identifiers in the Fleet Users list will be treated according to the Fleet Pricing time based pricing profile instead of the Public Pricing time based pricing profile because of their relative priority levels.

Flow moves from block 735 to block 740, where the pricing specification module 430 receives input from the host that the pricing specification is complete (that is, there is no more pricing specification records to add). With reference to FIG. 11, the host selects the submit pricing specification button 1135. Flow moves from block 740 to 745, where the pricing specification module 430 creates the pricing specification according to the input of the host and stores the pricing specification in the pricing specification store 460.

Figure 8:
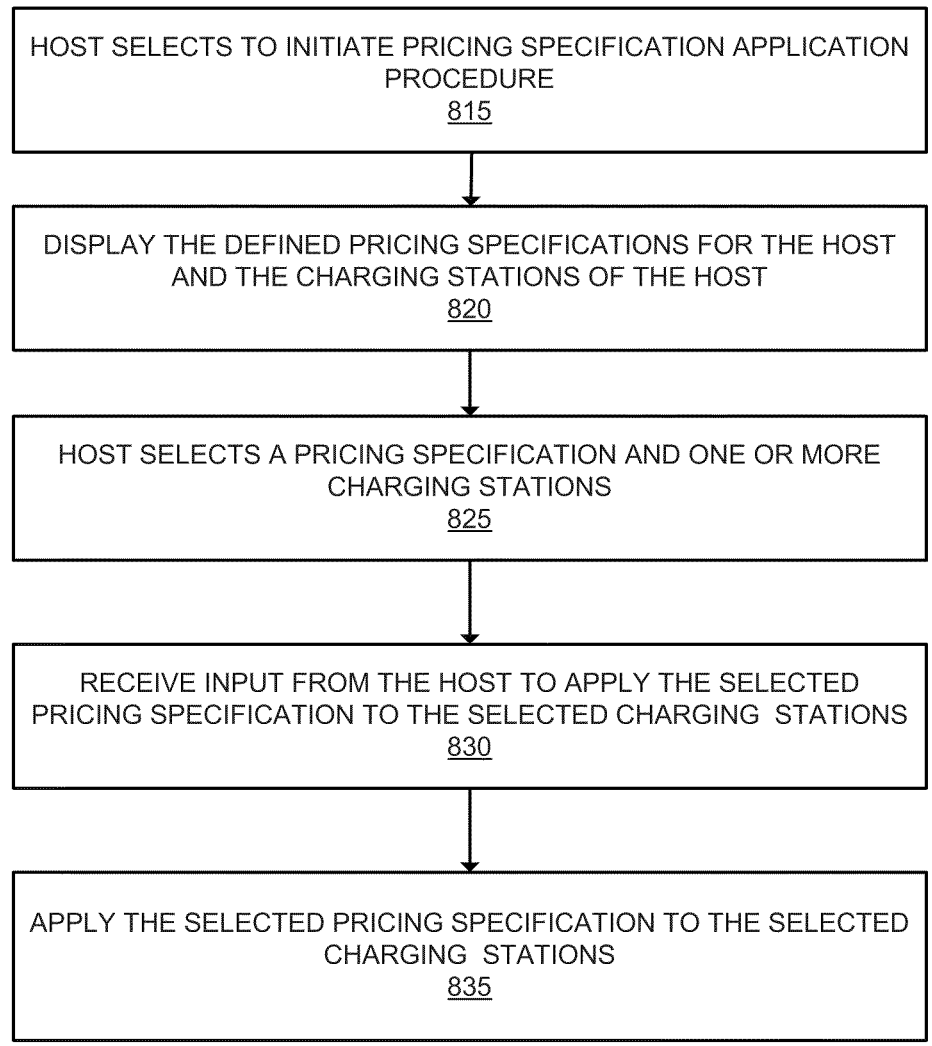
FIG. 8 is a flow diagram illustrating exemplary operations for applying a pricing specification to one or more charging stations through use of a host definable pricing interface according to one embodiment of the invention.

Sometime after pricing specifications are established, the host can use the host definable pricing interface 230 of the host portal 150 to apply those pricing specifications to charging stations and/or charging point connections. The pricing specification application module 435 is used to apply or remove the application of pricing specifications to charging stations and/or charging point connections. FIG. 8 is a flow diagram illustrating exemplary operations for applying a pricing specification to one or more charging stations through use of a host definable pricing interface according to one embodiment.

Figure 12:
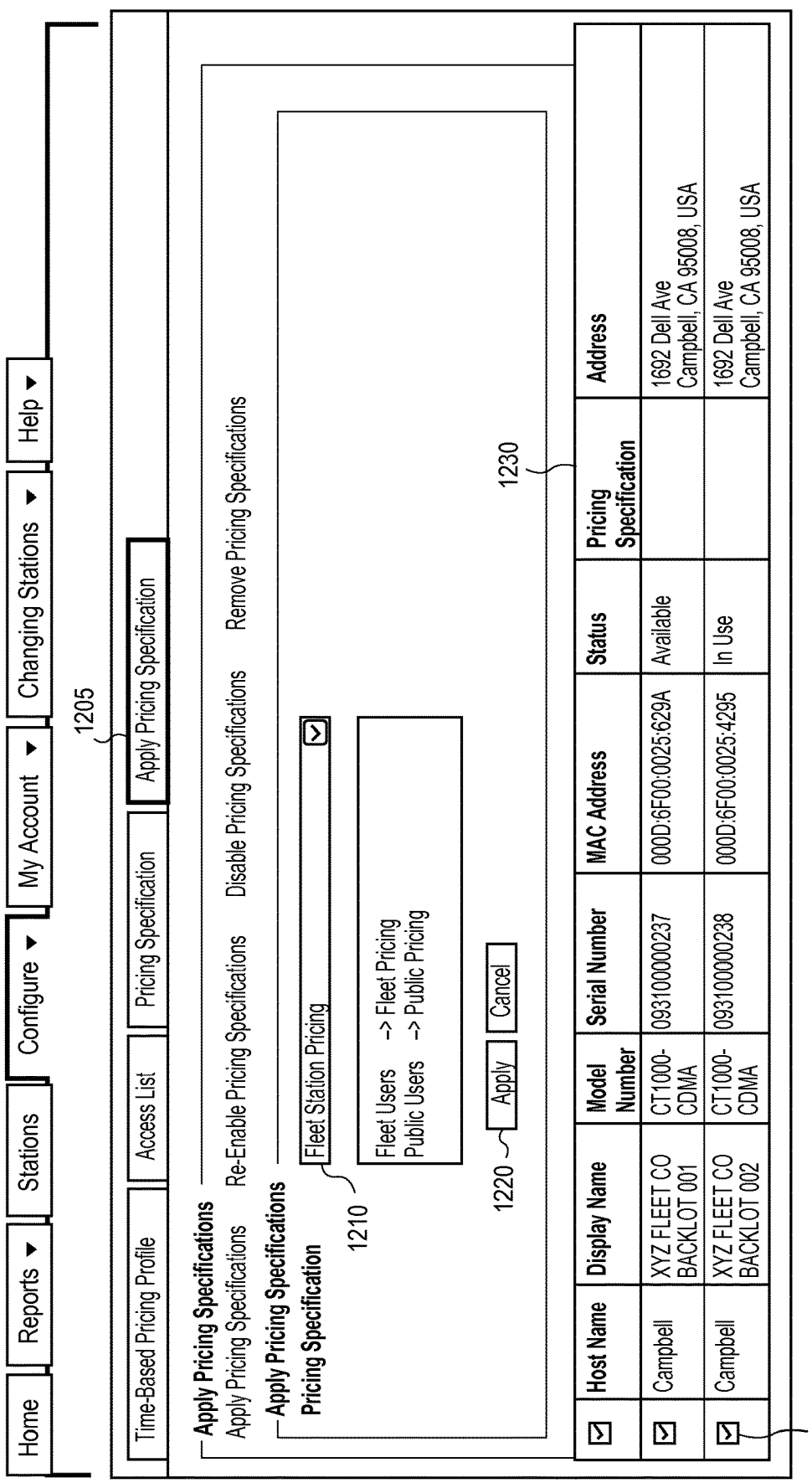
FIG. 12 illustrates an exemplary host definable pricing interface that allows hosts to apply pricing specifications to one or more of their charging stations and/or charging point connections according to one embodiment of the invention.

FIG. 8 will be described in reference to the exemplary embodiments of FIGS. 4 and 12; however it should be understood that the operations described in reference to FIG. 8 can be performed by embodiments other than those discussed with reference to FIGS. 4 and 12; and exemplary embodiments described in reference to FIGS. 4 and 12 can perform operations other than those discussed with reference to FIG. 8. FIG. 12 illustrates an exemplary host definable pricing interface 230 of the host portal 150 that allows hosts to apply pricing specifications to one or more of their charging stations and/or charging point connections according to one embodiment.

With reference to FIG. 8, at block 815, the host selects to initiate a pricing specification application procedure. For example, with reference to FIG. 12, the host selects the apply pricing specification tab 1205 of the host definable pricing interface 230. Flow then moves to block 820, where the pricing specifications defined for the host (and possibly default pricing specifications) and the host's charging stations are displayed to the host. For example, with reference to FIG. 12, the pricing specifications for the host are displayed in the list in the pricing specification list 1210 and the charging stations of the host are displayed in the charging station table 1230. In some embodiments, the charging point connections of the charging stations are also displayed to the host. It should be understood that the use of a table for allowing the hosts to select charging stations is exemplary and other mechanisms can be used in embodiments. For example, in some embodiments the host definable interface 230 includes an interactive map that allows the host to graphically view and select one or more of their charging stations.

Flow moves from block 820 to block 825, where the hosts select a pricing specification and one or more charging stations in which that pricing specification should be applied. For example, with reference to FIG. 12, the host selects one of the pricing specifications listed in the pricing specification list adb10 and one or more of the charging stations using the charging station selection checkbox 1215. In some embodiments, the host can also select one or more charging station point connections. Control then flows to block 830, where the pricing specification application module 435 receives input from the host to apply the selected pricing specification to the selected charging station(s). For example, the pricing specification application module 435 updates the charging station information store 465 by associating a particular pricing specification with a charging station (or a charging point connection if selected). As will be described in greater detail later herein, authorization and accounting for vehicle operators using a charging station may be affected by applying a pricing specification to the charging station.

Referring back to FIG. 2, the server 140 also includes the electric vehicle operator portal 260. The portal 260 includes the electric vehicle operator registration interface 275, the charging station locator interface 280, the charge status interface 285, and the electric vehicle operator accounting interface 290. The electric vehicle operator registration interface 275 allows potential customers (e.g., electric vehicle operators) to sign up for charging services. For example, the electric vehicle operator registration interface 275 collects contact point information from electric vehicle operators (e.g., name, address, email address, telephone number, etc.), type of electric vehicle(s) and/or type of electricity storage device, and service plan information.

In some embodiments of the invention, the electric vehicle operator registration interface 275 also allows operators to provide notification message preferences for receiving notification messages upon certain events occurring. For example, each operator may provide a notification message preference to receive notification messages for each event that interests them (those events the operator wishes to receive notification messages on). The events of interest may include one or more suspension or termination of a charging session events, one or more charge status events, one or more update events, one or more parking events, and/or one or more alarm events. For example, each operator may provide a notification message preference for an event in interest (whether they want to receive a notification message for that event) for the following events: fully charged vehicle, charging has been interrupted (e.g., the charging cord has been removed from the vehicle or has been severed, the station has encountered a power loss, etc.), charging has completed, charging is nearing completion, the utility operating the power grid has caused their charging of the vehicle to be suspended (e.g., the load on the grid exceeded a Demand Response threshold), the operator forgot to plug in their charging cord into their vehicle, etc. The vehicle operators may choose to receive one or any combination of the above events that interest them. In addition, the operators may be able to choose the format of the notification messages (e.g., receive through email, through text message, etc.). In addition, the operators may provide one or more contact points specific for notification messages (e.g., email address(es), text message address(es) (e.g., phone number(s)), etc.). It should also be understood that one or more events may have default notification message preference values.

The charging station locator interface 280 allows electric vehicle operators to locate charging stations (available and/or unavailable charging stations). In one embodiment, the charging station locator interface 280 allows the electric vehicle operators to restrict or refine the search or charging stations based on price and/or charging point connection type. The charging station locator interface 280 may provide an interactive map for the vehicle operators to locate charging stations. The charging station locator interface 280 may also provide an estimated time when the charging station will become available for use. Electric vehicle operators may also use the charging station locator interface 280 to create a list of favorite charging station(s) for the server 140 to monitor their availability and notify the user (e.g., through email or text message) when those charging station(s) are available and/or unavailable. In addition, in some embodiments of the invention, the operators may use the charging station locator interface 280 to reserve charging stations for future use.

The charge status interface 285 allows operators to determine the charging status of their electric vehicles (that are currently being charged). According to one embodiment of the invention, the charge status interface 285 presents charge status information to the operator (e.g., amount of power currently being transferred, total amount of power transferred, amount of energy transferred, total amount of energy transferred, the amount of time the charging session has lasted, an estimate of the time left to charge their vehicle, etc.).

The electric vehicle operator accounting interface 290 allows operators to review accounting information (e.g., the number of sessions remaining in their subscription, payment and/or invoice information, the amount of energy transferred to the power grid, amount of pre-paid credits remaining, etc.), and/or generate report(s) (e.g., illustrating power consumed from the power grid, illustrating power transferred to the power grid, illustrating an estimate of the amount of gasoline saved through use of their electric vehicle(s), illustrating an estimate of the amount of greenhouse gases they have saved from outputting through use of their electric vehicle(s), illustrating the amount of money saved in gasoline costs through use of their electric vehicle(s), etc.). In addition, the electric vehicle operator accounting module 290 may allow electric vehicle operators to review a history of the charging station(s) that they most often use. The electric vehicle operator accounting interface 290 may also allow the electric vehicle operators to add credits to a pre-paid account.

Figure 13:
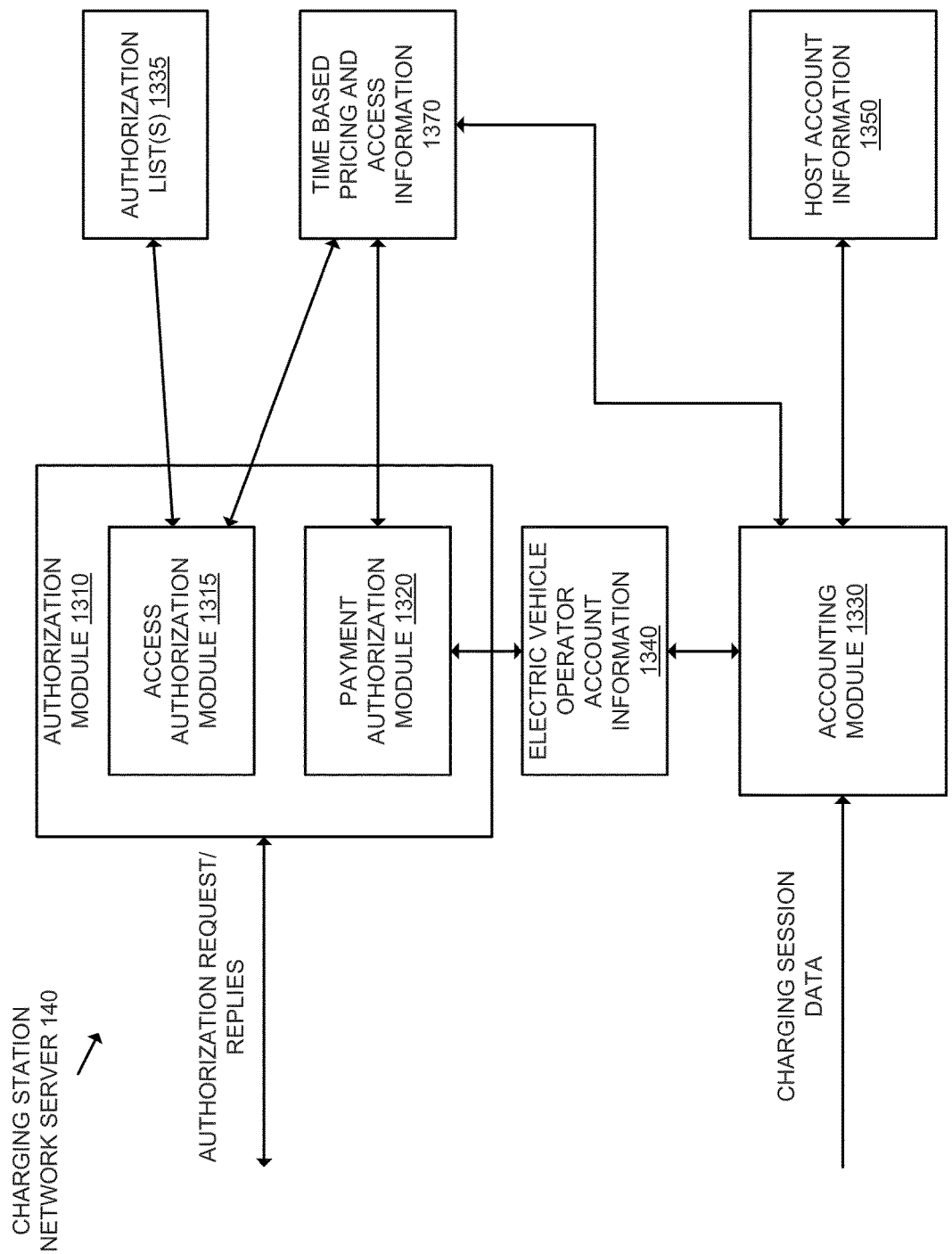
FIG. 13 is a block diagram illustrating an exemplary authorization and accounting procedure performed in some embodiments of the invention.

As previously described, after the hosts define pricing for one or more of their charging stations, the pricing is applied to those charging stations. This will affect the accounting for the charging sessions of those charging stations. FIG. 13 is a block diagram illustrating an exemplary authorization and accounting procedure performed in some embodiments of the invention. FIG. 13 will be described with reference to the exemplary flow diagrams of FIGS. 14, 15, and 16; however it should be understood that FIG. 13 can perform different operations than those discussed with reference to FIGS. 14, 15, and 16, and the FIGS. 14, 15, and 16 can be performed by embodiments other than those discussed with reference to FIG. 13.

The authorization module 1310 includes the access authorization module 1315 and the payment authorization module 1320. The access authorization module 1315 determines whether an access identifier presented by an electric vehicle operator is authorized to use the charging station at the time of the request. If the access identifier is authorized to use the charging station and payment is required to be authorized, the payment authorization module 1320 determines whether proper payment credentials have been presented or the account associated with the access identifier is otherwise in good standing.

Figure 14:
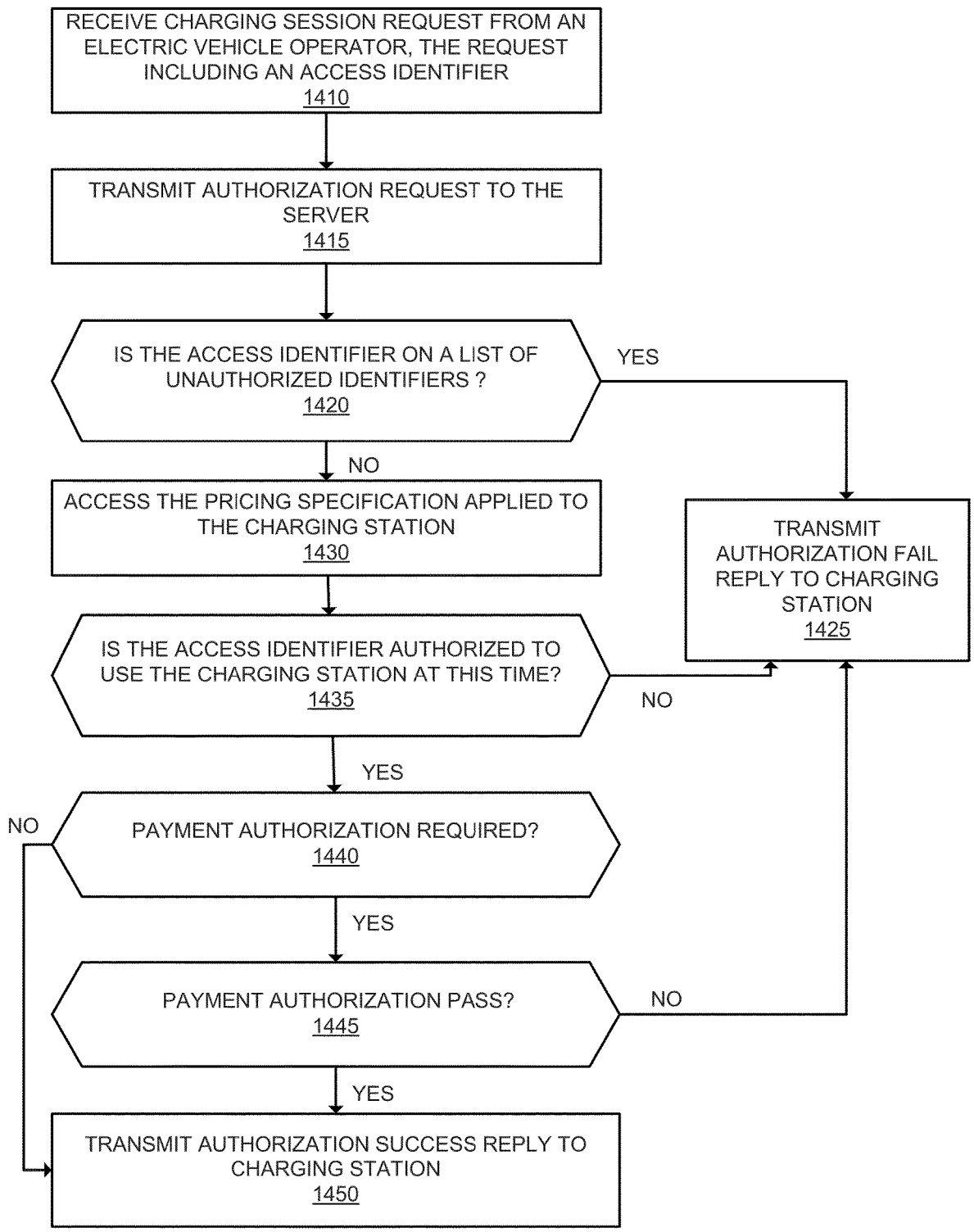
FIG. 14 is a flow diagram illustrating exemplary operations for performing an authorization procedure according to one embodiment of the invention.

FIG. 14 is a flow diagram illustrating exemplary operations for performing an authorization procedure according to one embodiment. At block 1410, a charging station has received a charging session request from an electric vehicle operator. The request includes an access identifier associated with the electric vehicle operator. The access identifier may be presented in multiple ways and can be different for different operators. For example, the access identifier may be an RFID tag (e.g., from a smartcard, contactless credit card, etc.), a username/password, an email address, a phone number, an address, a credit card number, account number, PIN (personal identification number), or any other identifying information associated with the electric vehicle operator, or may be an identifier associated with the electric vehicle (e.g., the vehicle's VIN). In some embodiments, the charging session request also includes a charging session payment type (e.g., per charging session, per amount of time, per amount of current elapsed), which may be selected by the electric vehicle operator or may be derived from the type of request. In some embodiments, the charging session request also includes an amount of charge requested (e.g., an amount of time (e.g., 1 hour), an amount of energy, a monetary amount (e.g., ten dollars of energy or charging time), etc.).

Flow moves from block 1410 to block 1415, where the charging station transmits an authorization request to the server to authorize the access identifier. The authorization request includes a charging station identifier, which uniquely identifies the charging station, and the access identifier. The authorization request may also include the time of the charging session request (or the time of the request may be estimated by the server based on the arrival of the authorization request). The authorization request may also include the charging session payment type and the amount of charge requested if included in the charging session request. The authorization request may also include a charging point connection identifier that identifies the type of charging point connection the request is for. With respect to FIG. 13, the authorization module 1310 receives the authorization request from the charging station. Flow moves from block 1415 to block 1420.

At block 1420, the authorization access module 1315 determines if the access identifier is on a list of unauthorized identifiers by accessing the authorization list(s) 1335. For example, the server 140 may maintain a list of identifiers that are known to be associated with fraudulent accounts or accounts that are otherwise not in good standing. If the access identifier is on such a list, then flow moves to block 1425 where the authorization module $10 transmits an authorization fail reply message to the charging station. The charging station may then display an appropriate error to the vehicle operator requesting the charging session. If the access identifier is not on such a list, then flow moves to block 1430.

At block 1430, the authorization access module 1315 accesses the applicable pricing specification for the charging station and/or the charging point connection. As illustrated in FIG. 13, the pricing specification is stored as part of the time based pricing and access information 1370, which in reference to FIG. 4, includes the time based pricing profile store 450, the access list store 455, and the pricing specification store 460. Flow then moves to block 1435.

At block 1435, the authorization access module 1315 determines whether the access identifier is authorized to use the charging station at this time, based on the pricing specification. For example, if the access identifier is not represented on an access list for allowed access in the pricing specification applicable to the charging station (or charging point connection), the access identifier will not be authorized to use the charging station. If the access identifier is not authorized to use the charging station at this time, then flow moves to block 1425; otherwise flow moves to block 1440.

Figure 16:
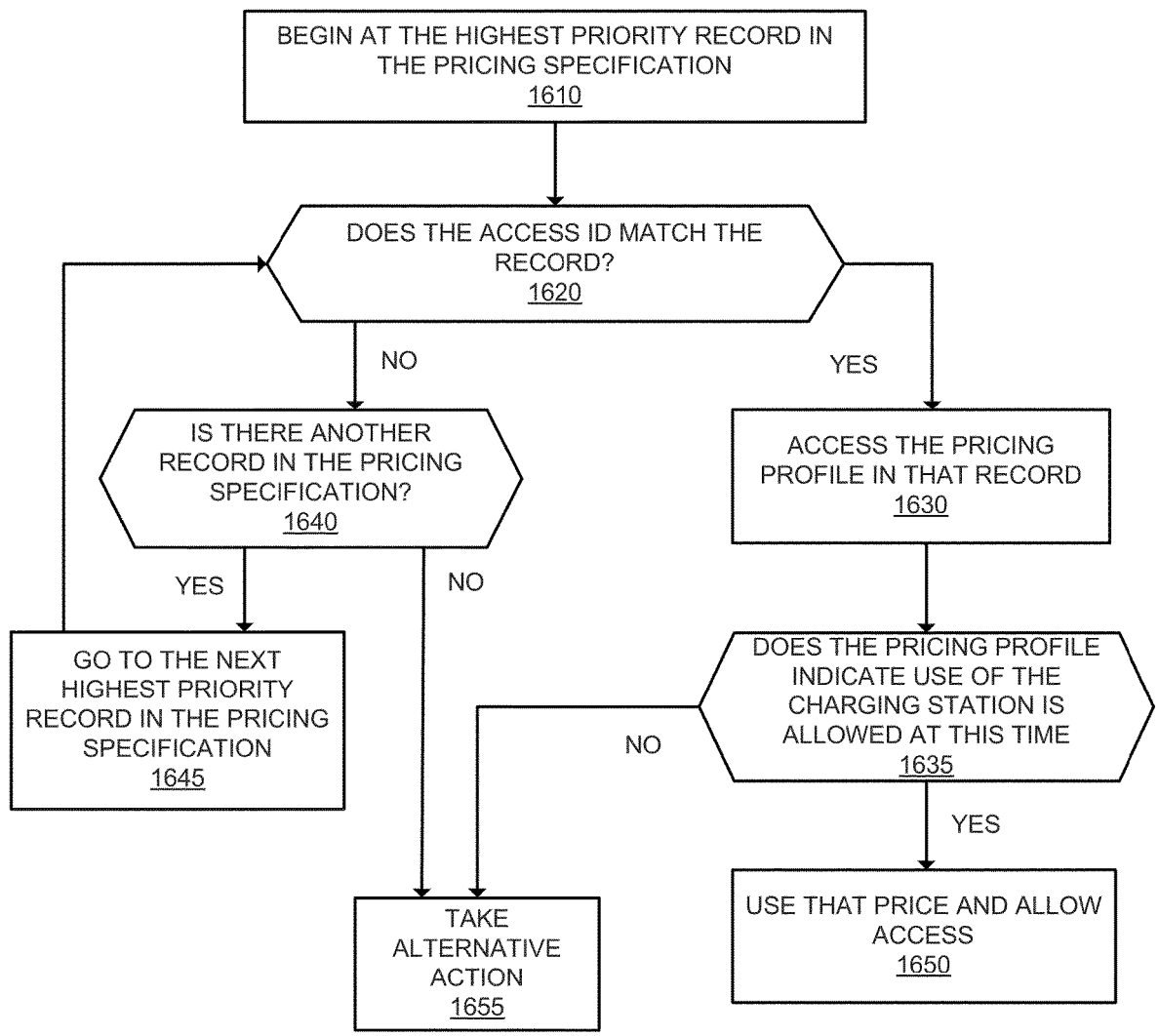
FIG. 16 is a flow diagram illustrating exemplary operations for determining whether an access identifier matches a pricing specification record applicable for the charging station according to one embodiment of the invention.

For example, FIG. 16 is a flow diagram illustrating exemplary operations for determining whether the access identifier matches a pricing specification record applicable for the charging station according to one embodiment of the invention. At block 1610, the procedure begins at the highest priority record in the pricing specification. Flow then moves to block 1615 where the access authorization module 1315 determines whether the access identifier matches the pricing specification record. It should be understood that the access identifier may not specifically match an identifier of the pricing specification record; that is, the access identifier may match a wildcard identifier on the pricing specification record. If there is a match, then flow moves to block 1630; otherwise flow moves to block 1640.

At block 1630, the authorization access module 1315 accesses the time based pricing profile in the matching pricing specification record, and then flow moves to block 1635. At block 1635, the authorization access module 1315 determines whether the time based pricing profile in that record indicates that the access identifier is allowed access to the charging station at this time. For example, with reference to FIG. 9, the Public Pricing time based pricing profile includes two time based pricing profile records, one that allows charging on weekdays between 08:00-16:00 and one that denies charging on weekends and weekdays between 00:00-07:59 and 16:01-23:59. Thus, even though an access identifier may be included on an access list of the pricing specification, that identifier may not presently be able to use the charging station. If the time based pricing profile indicates that the access identifier is not authorized to use the charging station at this time (which includes the day/date) then flow moves to block 1655 where alternative action is taken (e.g., the authorization module 1310 transmits an authorization fail reply message to the charging station, the authorization module 1310 transmits a notification message to the vehicle operator associated with the access identifier that alerts the operator of the failure and/or when the vehicle operator can use the charging station, etc.). If the time based pricing profile indicates that the access identifier is authorized to use the charging station at this time, then flow moves to block 1650 where the price is determined from the time based pricing profile and access is allowed. However, it should be understood that a payment authorization may still need to be performed.

Referring back to block 1640 (the access identifier did not match the pricing specification record), the access authorization module 1315 determines whether there is another record in the pricing specification. If there is, then flow moves to block 1645 where the access authorization module 1315 accesses the next highest priority record in the pricing specification and flow moves back to block 1620. If there is not, then flow moves to block 1655 where alternative action is taken (e.g., the authorization module 1310 transmits an authorization fail reply message to the charging station, the authorization module 1310 transmits a notification message to the vehicle operator associated with the access identifier that alerts the operator of the failure, etc.).

In some embodiments, the operations described in FIG. 16 are augmented using a most-specific matching mechanism to determine the appropriate pricing specification record to use based on the most-specific matching of an access identifier. For example, the hosts may configure the matching mechanism to search for the best match. Consider the access identifier "123456" which would match an access list having identifier "123*" and match a different access list having the identifier "123456." If using a most-specific matching mechanism, the access list having the identifier "123456" would be used since it more specifically matches the access identifier as compared with the access list having the identifier "123*." As a result, the pricing/access information associated with the identifier "123456" will be used.

Referring back to FIG. 14, at block 1440 (the access identifier is authorized to use the charging station), the authorization module 1310 determines if payment authorization is required or requested. For example, if the electric vehicle operator is paying by credit card, a credit payment authorization procedure may be performed to determine if the credit card is accepted. As another example, if the electric vehicle is paying through a pre-paid account, a payment authorization is performed to determine whether there is sufficient balance in the account. If payment authorization is not required (e.g., the price is free, the electric vehicle operator is paying in cash, etc.), then flow moves to block 1450 where the authorization module 1310 transmits an authorization success reply message to the charging station. If payment authorization is required, then flow moves to block 1445.

At block 1445, the payment authorization module 1320 performs a payment authorization procedure. For example, if paying with a pre-paid account (which may be derived from the type of access identifier used), the payment authorization module 1320 accesses the electric vehicle operator account information 1340, which stores account information including the current balances for electric vehicle operators, to determine whether there is sufficient credit for the charging session. Although the electric vehicle operator account information 1340 is illustrated as being located on the server 140, it should be understood that in some embodiments the hosts maintain their own electric vehicle operator account information which is accessed through the payment authorization module 1320. As another example, if paying with a credit card, the payment authorization module 1320 performs a credit card authorization check to determine whether the credit card is accepted. If the payment authorization does not pass, then flow moves to block 1425; otherwise flow moves to block 1450.

In some embodiments, the authorization success reply message indicates how much time and/or energy the access identifier is authorized for. For example, assume that a prepaid account associated with the access identifier has credits for one hour of charging. The authorization success reply message (or other message) may instruct the charging station to allow charging for a limit of one hour (thus after this hour the charging station may de-energize and prevent charging until more credit is added to the account). A notification message may also be sent to the electric vehicle operator associated with the access identifier if a prepaid account is below a certain threshold of credit.

Figure 15:
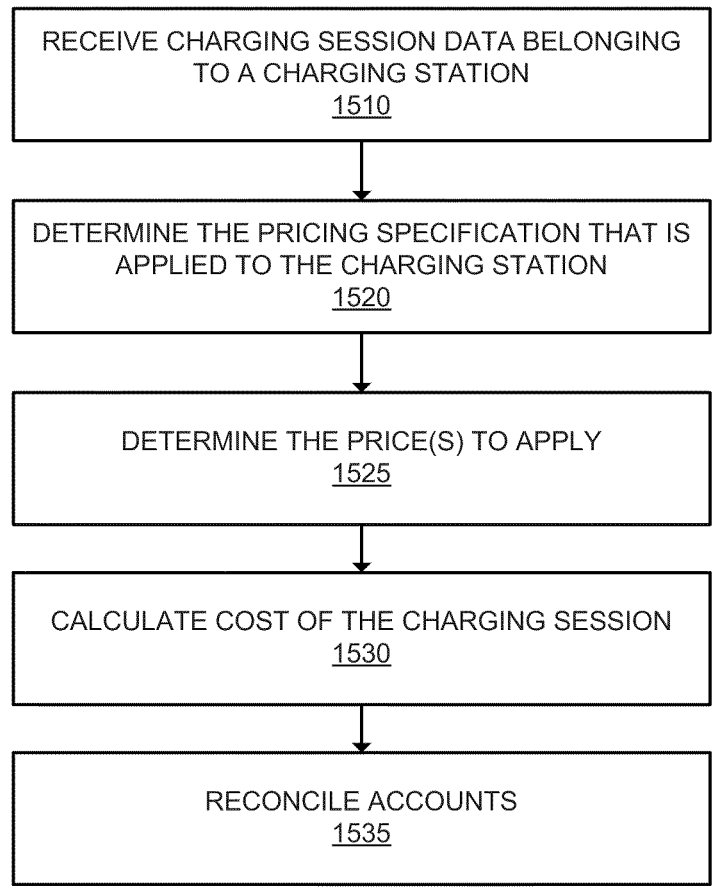
FIG. 15 is a flow diagram illustrating exemplary operations for an accounting procedure using host defined pricing according to one embodiment of the invention.

FIG. 15 is a flow diagram illustrating exemplary operations for an accounting procedure using host defined pricing according to one embodiment. In one embodiment, the server 140 performs accounting and billing on behalf of the hosts 105 and 115 for the charging stations 110A-110N and 120A-120L. At block 1510, the accounting module 1330 receives charging session data from a charging session. The charging session data includes one or more of a charging station identifier, a charging connection type identifier, the access identifier associated with a charging session, the charging session start time, the charging session stop time, and the amount of energy consumed by an electric vehicle during the charging session. In some embodiments, the amount of energy consumed spans two or more pricing periods. In such embodiments, the charging station may include a programmable time of use energy meter that can be programmed with different time periods (e.g., as defined by the host) so that different energy readings can be made for different time periods. Flow then moves to block 1520.

Figure 17:
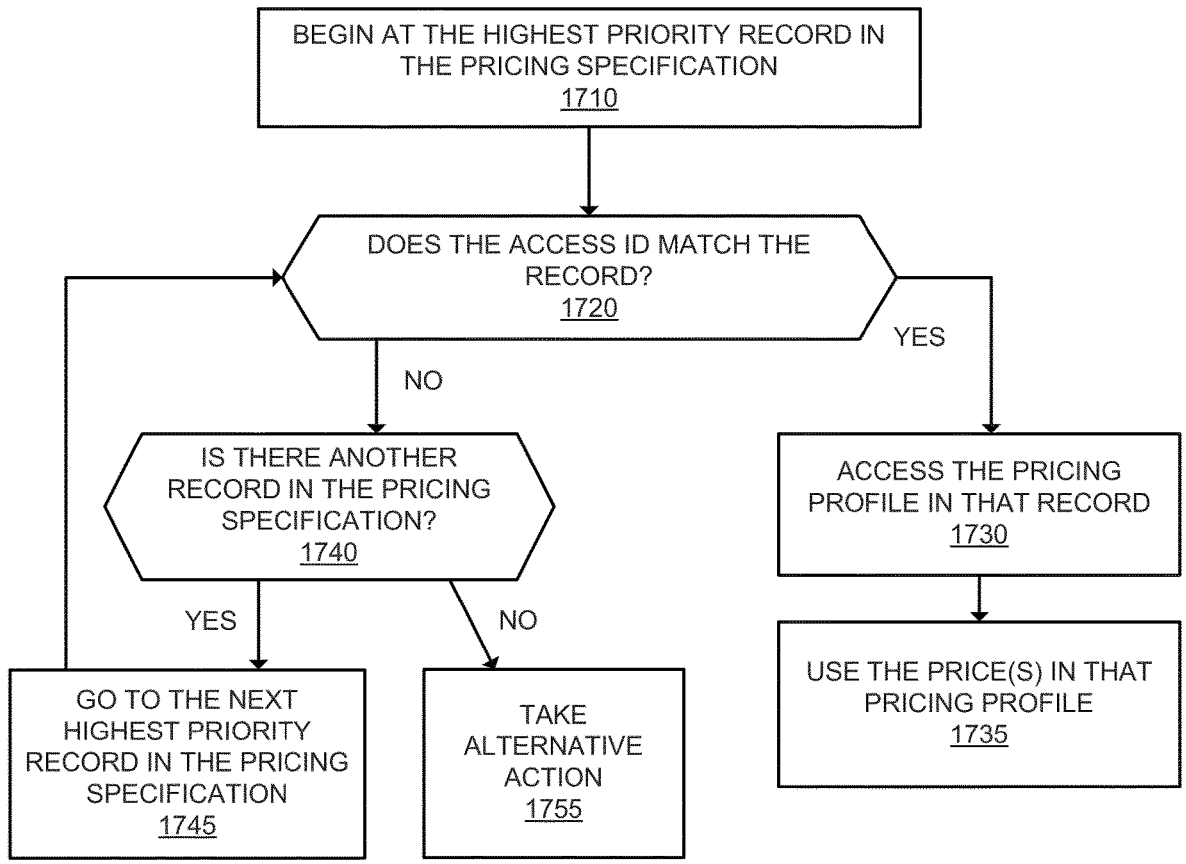
FIG. 17 is a flow diagram illustrating exemplary operations for determining the host definable price(s) to apply for accounting according to one embodiment of the invention.

At block 1520, the accounting module 1330 determines the pricing specification that is applied to the charging station. For example, based on the charging station identifier and/or the charging connection type, the accounting module 1330 accesses the pricing specification store in the time based pricing and access information 1370 to determine the applicable pricing specification. Flow then moves to block 1525, where the accounting module 1330 determines, from the pricing specification, the price(s) to apply for the charging session. In one embodiment, the operations described in reference to FIG. 17, which is a flow diagram illustrating exemplary operations for determining the price(s) to apply according to one embodiment, are used to determine the price(s) to apply. Referring to FIG. 17, At block 1710, the procedure begins at the highest priority record in the pricing specification. Flow then moves to block 1715 where the accounting module 1330 determines whether the access identifier matches the pricing specification record. It should be understood that the access identifier may not specifically match an identifier of the pricing specification record; that is, the access identifier may match a wildcard identifier on the pricing specification record. If there is a match, then flow moves to block 1730; otherwise flow moves to block 1740.

At block 1730, the accounting module 1330 accesses the time based pricing profile in the matching pricing specification record, and then flow moves to block 1735. At block 1735, the accounting module 1330 uses the price(s) in that pricing profile for its calculation. Referring back to block 1740, (the access identifier did not match the pricing specification record), the accounting module 1330 determines whether there is another record in the pricing specification. If there is, then flow moves to block 1745 where the accounting module 1330 access the next highest priority record in the pricing specification and flow moves back to block 1720. If there is not, then flow moves to block 1755 where alternative action is taken (e.g., a default price is used, a notification message is sent to the host that alerts the host of a pricing error, etc.).

In some embodiments, the operations described in FIG. 17 are augmented using a most-specific matching mechanism to determine the appropriate pricing specification record to use based on the most-specific matching of an access identifier as similarly described in reference to FIG. 16.

Referring back to FIG. 15, after the accounting module 1330 determines which host defined price(s) apply, flow moves to block 1530 where the accounting module 1330 calculates the cost of the charging session. Flow then moves to block 1535 where the accounting module 1330 reconciles the accounts. For example, the accounting module 1330 may credit the account of the host in the host account information 1350 as appropriate (minus any fees charged by the network operator). The account module 1330 may also, on behalf of the hosts, account for the price of electricity consumed through their charging stations from the utilities providing that electricity.

In one embodiment, the pricing specifications are transmitted to the charging stations. The charging station may interpret the pricing specification and display current price(s) for charging electric vehicles and its availability (e.g., whether it is in restricted mode or open mode). In some embodiments, instead of transmitting an authorization request to the server, the charging station locally determines whether to authorize the charging session request based on its stored copy of the pricing specification. When a pricing specification is modified (e.g., a price has been changed, an identifier on an access list has been added/removed/changed, etc.), updated pricing specifications are transmitted to each applicable charging station.

In some embodiments, the charging stations include a programmable time of use energy meter that can be programmed with different time periods (e.g., as defined by the host in the pricing specification) so that different energy readings can be made for different time periods. For example, a charging session may span multiple time periods (e.g., daytime charging and night charging) and the programmable time of use energy meter may be used to record amount of energy for multiple time periods.

In some embodiments, the charging stations calculate and display the cost of the charging in real time. For example, if the charging service is being paid based on the amount of time elapsed during the charging session, the charging station calculates the cost based on the price set by the host and the amount of time that has elapsed. As another example, if the charging service is being paid based on the amount of energy consumed during the charging session, the charging station calculates the cost based on the price set by the host and the amount of energy being consumed. The charging station may periodically perform the cost calculation (e.g., every few seconds).

Figure 18:
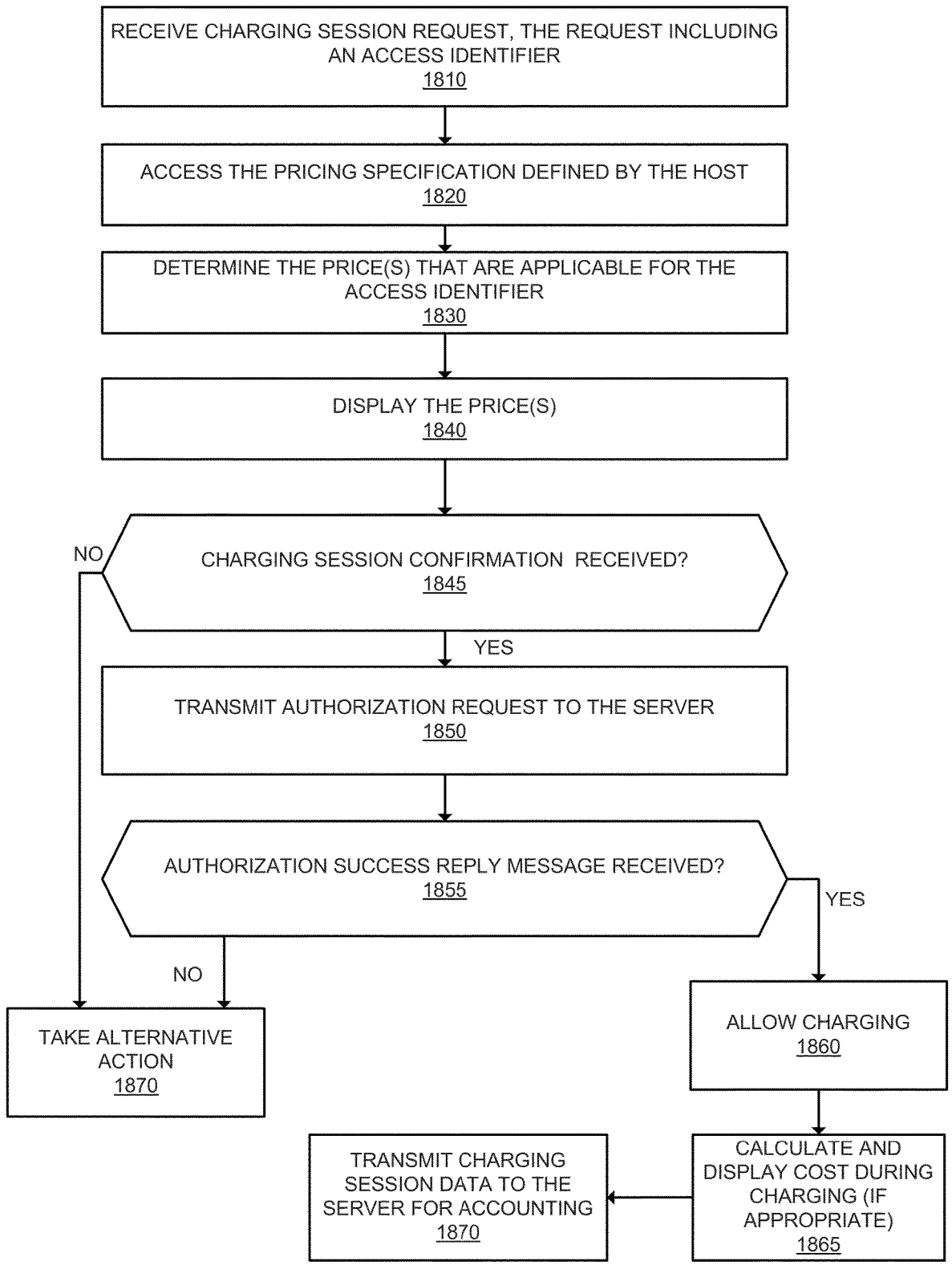
FIG. 18 is a flow diagram illustrating exemplary operations for a charging station to display and use host defined pricing according to one embodiment of the invention.

FIG. 18 is a flow diagram illustrating exemplary operations for a charging station to display and use host defined pricing according to one embodiment of the invention. At block 1810, a charging station receives a charging session request that includes an access identifier. In some embodiments a vehicle operator waves/swipes an RFID enabled device near an RFID reader of the charging session (or a payment station coupled with the charging station) to request a charging session with the charging station. Of course the charging session can be requested differently in different embodiments (e.g., using a user interface of the charging station, using a remote application (e.g., an application on a mobile phone or laptop), through the electric vehicle (e.g., the vehicle's VIN transmitted through PLC), etc.). The request may also indicate a charging connection point type. Flow moves from block 1810 to block 1820.

As described above, in some embodiments the charging stations store pricing specifications defined by their hosts. Thus at block 1820, the charging station accesses the pricing specification defined by the host. Flow then moves to block 1830 where the charging station determines the price(s) that are applicable for the access identifier. For example, the charging station performs the operations described in reference to FIG. 17 to determine the appropriate price(s) for the access identifier. Depending on the time based pricing profile record accessed, the charging station may also use the time of the charging session request to determine the appropriate price(s) for the access identifier. It should be understood that there may be multiple prices (e.g., a price for charging per session, price for charging per amount of time, price for charging per amount of energy transferred, or any combination of the same, etc.). Flow then moves to block 18 where the charging station displays the price(s) to the user. Flow moves from block 1840 to block 1845.

At block 1845, the charging station determines if a charging session confirmation has been received from the electric vehicle operator. The charging session confirmation indicates that the electric vehicle operator wants to continue with the charging session (e.g., the price(s) are acceptable for the electric vehicle operator). The charging session confirmation may be received in a similar way as the charging session request. For example, the electric vehicle operator may wave/swipe an RFID enabled device near the RFID reader to confirm the charging session, use a user interface of the charging station (or a payment station coupled with the charging station) to indicate confirmation, etc. If there are multiple charging session payment options presented (e.g., pay per session, pay per amount of time, pay per amount of energy), the charging session confirmation also includes a selection of one of those payment options. If a charging session confirmation has been received, then flow moves to block 1850 where the charging station transmits an authorization request to the server. The server performs the authorization procedure in a similar way as described with reference to FIGS. 13-14. If a charging session confirmation has not been received, then flow moves to block 1870 where alternative action is taken (e.g., the charging session is cancelled).

At block 1855, the charging station determines whether it has received an authorization success reply message from the server. If it has received an authorization fail reply, then flow moves to block 1870 where alternative action is taken (e.g., the charging station displays an error message, a notification message is sent to the electric vehicle operator, etc). If the server is not replying (e.g., the connection is down), flow also moves to block 1870 where alternative action is taken (e.g., the pricing specification stored on the charging station is used to determine whether the access identifier is authorized, charging is allowed, etc.). If an authorization success reply message is received, then flow moves to block 1860 where the charging station allows charging (e.g., by energizing the charging point connection allowing electricity to flow between the electric vehicle and the charging station). Flow moves from block 1860 to block 1865, where the charging station calculates and displays the cost during charging if appropriate (e.g., if the charging session payment type is per amount of time or per amount of energy). Flow then moves to block 1870.

At block 1870, the charging station transmits charging session data to the server for accounting. As previously described, the charging station may include a time of use meter and may be measuring current that spans multiple time periods. The charging session data may include one or more of a charging station identifier, a charging connection type, the access identifier of the charging session, the charging session start time, the charging session stop time, and the amount of energy consumed by an electric vehicle of an electric vehicle operator during the charging session (which may be a net amount if some amount of electricity was transferred to the power grid in a V2G environment). The server performs the accounting procedure in a similar way as described with reference to FIG. 15.

In some embodiments, if there are multiple pricing specifications defined by the host for the charging station (e.g., for different charging point connections of the charging station), the operations described in reference to blocks 1820 and 1840 are performed for each pricing specification.

Although FIG. 18 illustrated the charging station using its local pricing specification to determine the price(s) to display to an electric vehicle operator, in other embodiments the charging station transmits an authorization request to the server which responds with the price(s) to be displayed for the electric vehicle operator.

In another embodiment, the charging station transmits a message, which may be included in an initial authorization request, to determine whether its local pricing specification is current (that is, has the latest pricing information) responsive to receiving a charging session request. For example, a timestamp of the local pricing specification is transmitted to the server. If the local pricing specification is current, and the access identifier has passed an initial access authorization (e.g., performed by the access authorization module 1315 in FIG. 13), the charging station uses the local pricing specification to determine the appropriate price(s) to display. If the local pricing specification is not current, the server transmits an update to the charging station (the updated version is then used). For example, with reference to FIG. 18, after an access identifier has been initially authorized by the server and the pricing specification is determined current (or is updated by the server), the operations begin at block 1820 to display and use the pricing defined by the host.

Figure 19:
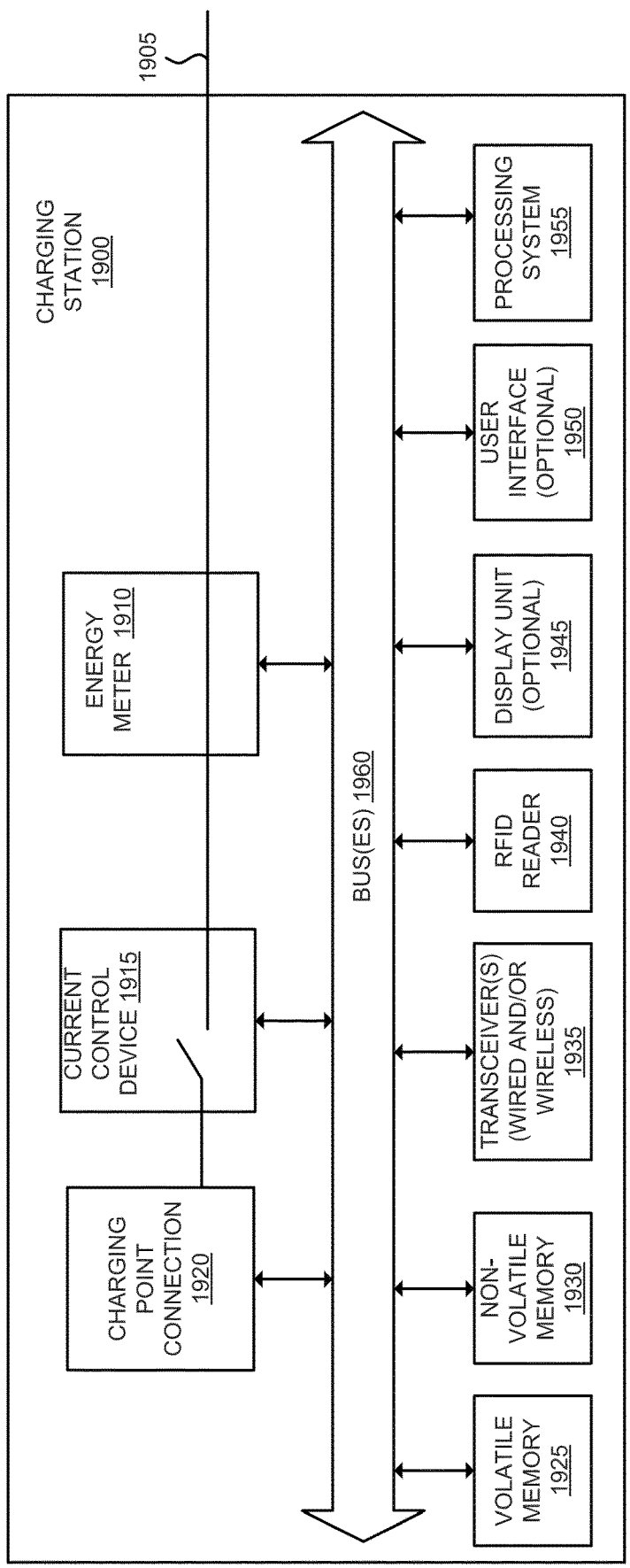
FIG. 19 illustrates an exemplary embodiment of a charging station according to one embodiment of the invention.

FIG. 19 illustrates an exemplary embodiment of a charging station according to one embodiment of the invention. It should be understood that FIG. 19 illustrates an exemplary architecture of a charging station, and other, different architectures may be used in embodiments of the invention described herein.

As illustrated in FIG. 19, the charging station 1900 includes the energy meter 1910, the current control device 1915, the charging point connection 1920, the volatile memory 1925, the non-volatile memory 1930 (e.g., hard drive, flash, PCM, etc.), one or more transceiver(s) 1935 (e.g., wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, etc.)), the RFID reader 1940, the display unit 1945 (which is optional), the user interface 1950 (which is optional), and the processing system 1955 (e.g., one or more microprocessors and/or a system on an integrated circuit), which are coupled with one or more buses 1960. The pricing specification(s) for the charging station 1900 are stored in the non-volatile memory 1930.

The energy meter 1910 measures the amount of electricity that is flowing on the power line 1905 through the charging point connection 1920. While in one embodiment of the invention the energy meter 1910 measures current flow, in an alternative embodiment of the invention the energy meter 1910 measures power draw. The energy meter 1910 may be an induction coil or other devices suitable for measuring electricity. In some embodiments, the energy meter 1910 is a programmable time of use energy meter (e.g., programmed according to the prices and time periods defined by its host).

The charging point connection 1920 is a power receptacle or circuitry for an attached charging cord (e.g., with a SAE J1772 connector). The power receptacle can be any number of types of receptacles such as receptacles conforming to the NEMA (National Electrical Manufacturers Association) standards 5-15, 5-20, and 14-50 or other standards (e.g., BS 1363, CEE7, etc.) and may be operating at different voltages (e.g., 120V, 240V, 230V, etc.).

The current control device 1915 is a solid-state device that is used to control the current flowing on the power line 1905 or any other device suitable for controlling the current flowing on the power line 1905. For example, in some embodiments the current control device 1915 energizes the charging point connection 420 (e.g., by completing the circuit to the power line 1905) or de-energizes the charging point connection 1920 (e.g., by breaking the circuit to the power line 1905). In some embodiments the current control device 1915 energizes the charging point connection 1920 responsive to receiving an authorized request from an electric vehicle operator.

The RFID reader 1940 reads RFID tags from RFID enabled devices (e.g., smartcards, key fobs, contactless credit cards, etc.), embedded with RFID tag(s) of operators that want to use the charging station 1900. For example, in some embodiments a vehicle operator can wave/swipe an RFID enabled device near the RFID reader 1930 to request a charging session with the charging station 1900. It should be understood, however, that charging sessions may be requested in different ways and access identifiers may be presented to the charging station in different ways. For example, in some embodiments the electric vehicles communicate an access identifier (e.g., their VIN) to the charging station through a protocol (e.g., PLC). In such embodiments, the electric vehicle operator may not be required to present an access identifier (such as the RFID enabled device) to gain access to the charging station. However, it should be understood that the electric vehicle operators may use the RFID reader 1940 for payment.

The transceiver(s) 1935 transmit and receive messages. For example, the transceiver(s) 1935 receive pricing specifications from the server, transmit authorization requests to the server, transmit charging session data to the server for accounting, etc. The display unit 1945 is used to display messages to vehicle operators including the price(s) for charging service, current cost for charging service, charging status, confirmation messages, error messages, notification messages, etc. The display unit 1945 may also display parking information if the charging station 1900 is also acting as a parking meter (e.g., amount of time remaining in minutes, parking violation, etc.).

The user interface 1940 (which is optional) allows users to interact with the charging station 1900. By way of example, the user interface 1950 allows electric vehicle operators to request charging sessions, pay for charging sessions, enter in account and/or payment information, etc.

The processing system 1955 may retrieve instruction(s) from the volatile memory 1925 and/or the nonvolatile memory 1930, and execute the instructions to perform operations as described above.

The techniques shown in the figures can be implemented using code and data stored and executed on one or more electronic devices (e.g., a charging station, a charging station network server, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

While embodiments of the invention have been described in reference to creating a pricing specification with a certain structure (e.g., a time based pricing profile associated with an access list), it should be understood that such structure is exemplary and embodiments are not so limited. For example, pricing specifications may be directly applied to charging stations without creating time based pricing profiles, or access lists, etc.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An electric vehicle charging station network, comprising:
    a plurality of electric vehicle charging stations belonging to a plurality of charging station hosts, wherein each host controls one or more of the plurality of electric vehicle charging stations; and
    a charging station network server that provides a single interface that allows each of the plurality of hosts to:
        define through the single interface a first access list that includes a first plurality of access identifiers that represent authorized access for use of a first plurality of electric vehicle charging stations belonging to that host, and define through the single interface a second access list that includes a second plurality of access identifiers that represent authorized access for use of a second plurality of electric vehicle charging stations belonging to that host, wherein the first plurality of electric vehicle charging stations and the second plurality of electric vehicle charging stations are different, wherein authorization to use the first plurality of electric vehicle charging stations belonging to that host is limited to the first plurality of access identifiers included on the first access list, and wherein authorization to use the second plurality of electric vehicle charging stations belonging to that host is limited to the second plurality of access identifiers included on the second access list,
        define through the single interface a first pricing specification for charging electric vehicles on the first plurality of electric vehicle charging stations belonging to that host, and define a second pricing specification for charging electric vehicles on the second plurality of electric vehicle charging stations belonging to that host, wherein the first pricing specification defines a first cost of use and that the first access list applies to the first pricing specification, and wherein the second pricing specification defines a second cost of use and that the second access list applies to the second pricing specification, and
        apply the first and second pricing specification to the first and second plurality of electric vehicle charging stations belonging to that host respectively.

2. The electric vehicle charging station network of claim 1, wherein the charging station network server further communicates the first and second pricing specification to the first and second plurality of electric vehicle charging stations respectively, wherein the first plurality of electric vehicle charging stations are configured to display the pricing according to the received first pricing specification, and wherein the second plurality of electric vehicle charging stations are configured to display the pricing according to the received second pricing specification.

3. The electric vehicle charging station network of claim 1, wherein the single interface allows each host to define the first and second pricing specification based on one or more of time of day and date.

4. The electric vehicle charging station network of claim 1, wherein the single interface allows each host to specify, for each of the electric vehicle charging stations belonging to that host, restricted access status of that electric vehicle charging station based on one or more of time of day and date.

5. The electric vehicle charging station network of claim 1, wherein the single interface allows each host to exclude one or more vehicle operators from paying for charging service.

6. The electric vehicle charging station network of claim 5, wherein the exclusion is based on one or more of time of day and date.

* * * * *